United States Patent
Ivri et al.

(10) Patent No.: US 11,998,939 B2
(45) Date of Patent: Jun. 4, 2024

(54) PIEZOELECTRIC DISPENSER WITH A LONGITUDINAL TRANSDUCER AND REPLACEABLE CAPILLARY TUBE

(71) Applicant: BioDot, Inc., Irvine, CA (US)

(72) Inventors: Yehuda Ivri, Newport Beach, CA (US); Thomas C. Tisone, Orange, CA (US); Eric P. Kuo, Upland, CA (US); Shane Gunsalus, Westminster, CA (US)

(73) Assignee: BioDot, Inc., Irvine, CA (US)

( * ) Notice: Subject to any disclaimer, the term of this patent is extended or adjusted under 35 U.S.C. 154(b) by 0 days.

(21) Appl. No.: 17/451,310

(22) Filed: Oct. 18, 2021

(65) Prior Publication Data
US 2022/0305515 A1 Sep. 29, 2022

Related U.S. Application Data

(63) Continuation of application No. 15/326,457, filed as application No. PCT/US2015/042056 on Jul. 24, 2015, now Pat. No. 11,148,164.
(Continued)

(51) Int. Cl.
| | |
|---|---|
| B05B 17/06 | (2006.01) |
| B01J 19/00 | (2006.01) |
| B01L 3/02 | (2006.01) |

(52) U.S. Cl.
CPC ....... B05B 17/0669 (2013.01); B01J 19/0046 (2013.01); B01L 3/0268 (2013.01);
(Continued)

(58) Field of Classification Search
CPC ............ B05B 17/0669; B05B 17/0684; B05B 17/0607; B05B 12/06; B05B 15/62;
(Continued)

(56) References Cited

U.S. PATENT DOCUMENTS

| | | |
|---|---|---|
| 6,196,218 B1 | 3/2001 | Voges |
| 11,148,164 B2 | 10/2021 | Ivri et al. |

(Continued)

FOREIGN PATENT DOCUMENTS

| | | |
|---|---|---|
| CN | 2379315 Y | 5/2000 |
| CN | 1275099 A | 11/2000 |

(Continued)

OTHER PUBLICATIONS

Extended European Search Report for European Patent Application No. 15825366.6 dated Feb. 14, 2018, 8 pages.
(Continued)

*Primary Examiner* — Qingzhang Zhou
*Assistant Examiner* — Juan C Barrera
(74) *Attorney, Agent, or Firm* — Knobbe, Martens, Olson & Bear, LLP

(57) ABSTRACT

A dispenser and methods for transferring liquids are disclosed. The dispenser may include a capillary tube with tip having an aperture, a piezoelectric actuator coupled to the capillary tube at a location. Actuation of the piezoelectric actuator causes a pressure wave to propagate along the capillary tube toward the tip such that radial motion at the location is transmitted as distally extending axial motion of the tip, thereby causing a droplet of a predetermined volume to be ejected from the aperture. In some embodiments, the capillary tube has a modulus of elasticity in a range which dampens acoustical noise from the actuation and provides single drop stability over a range of drop sizes.

9 Claims, 23 Drawing Sheets

Related U.S. Application Data

(60) Provisional application No. 62/029,152, filed on Jul. 25, 2014.

(52) U.S. Cl.
CPC . B05B 17/0684 (2013.01); *B01J 2219/00367* (2013.01); *B01J 2219/00378* (2013.01); *B01J 2219/00722* (2013.01); *B01L 2300/0838* (2013.01); *B01L 2300/123* (2013.01); *B01L 2300/165* (2013.01); *B01L 2400/0481* (2013.01)

(58) Field of Classification Search
CPC .............. B05B 17/0623; B05B 17/063; B05B 17/0646; B05B 17/0653; B05B 17/0676; B01J 19/0046; B01J 2219/00367; B01J 2219/00378; B01J 2219/00722; B01J 2219/0036; B01L 3/0268; B01L 2300/0838; B01L 2300/123; B01L 2300/165; B01L 2400/0481; B01L 2400/0439; B01L 2300/0832
USPC ................................. 239/4, 102.1, 102.2, 68
See application file for complete search history.

(56) References Cited

U.S. PATENT DOCUMENTS

| | | |
|---|---|---|
| 2002/0158196 A1 | 10/2002 | Berggren et al. |
| 2002/0166961 A1 | 11/2002 | Berggren et al. |
| 2010/0024527 A1* | 2/2010 | LaMarr .................. G01N 30/24 250/288 |
| 2010/0273272 A1 | 10/2010 | Haas et al. |
| 2012/0304929 A1* | 12/2012 | Ivri ......................... B05B 15/62 118/712 |
| 2013/0206857 A1 | 8/2013 | Ivri |
| 2017/0203322 A1 | 7/2017 | Ivri et al. |

FOREIGN PATENT DOCUMENTS

| | | |
|---|---|---|
| CN | 1315913 A | 10/2001 |
| CN | 106687221 A | 7/2020 |
| EP | 3171985 | 5/2017 |
| WO | WO 00/50111 | 8/2000 |
| WO | WO 2012/100205 | 7/2012 |

OTHER PUBLICATIONS

Examination Report for European Patent Application No. 15825366.6 dated May 6, 2019, 5 pages.
International Search Report for International Patent Application No. PCT/US2015/042056 dated Oct. 13, 2015 in 3 pages.
Office Action for Chinese Patent Application No. 201580040999.5 dated Mar. 5, 2019, 6 pages.
Office Action for Chinese Patent Application No. 201580040999.5 dated Jul. 3, 2018, 7 pages.
Office Action for EP Patent Application No. 15825366.6 dated May 3, 2021, 5 pages.
Written Opinion for International Patent Application No. PCT/US2015/042056 dated Oct. 13, 2015 in 5 pages.

* cited by examiner

PIEZOELECTRIC DISPENSER WITH A LONGITUDINAL TRANSDUCER AND REPLACEABLE CAPILLARY TUBE

CROSS REFERENCE TO RELATED APPLICATIONS

This application is a continuation of U.S. application Ser. No. 15/326,457, filed Jan. 13, 2017, which is the U.S. National Phase of International Application No. PCT/US2015/042056, filed Jul. 24, 2015, which claims the benefit of U.S. Provisional Patent Application No. 62/029,152, filed Jul. 25, 2014. Any and all applications for which a foreign or domestic priority claim is identified here or in the Application Data Sheet as filed with the present application are hereby incorporated by reference in their entireties under 37 CFR 1.57.

BACKGROUND

Disclosed embodiments relate in general to systems and methods for acquiring and dispensing predetermined volumes of liquids and, more particularly but not exclusively, to piezoelectric devices and methods for dispensing and transferring small volumes of fluid in the form of single droplets or drops, typically ranging in volume from picoliters to nanoliters.

Conventional piezoelectric dispensing devices have a tube that is typically entirely surrounded by and bonded to a piezoelectric actuator to produce droplets. Activation of the piezoelectric actuator transmits acoustic pressure into and through the liquid in the tube. The acoustic pressure propagates through the liquid and to a dispensing opening of the tube. This results in ejection of a liquid drop from the device.

Such conventional devices have several disadvantages. One is that their operation is highly dependent on the characteristics and properties of the particular liquid to be dispensed. Thus, disadvantageously, dispensing parameters such as droplet size cannot be independently controlled and various compensative measures have to be taken which can increase cost and reduce efficiency.

Moreover, to transmit pressure to the liquid in the tube to dispense a droplet a relatively force (energy) needs to be imparted by the piezoelectric actuator. This can not only raise system and operational costs, but can undesirably lead to degradation, damage and denaturing of the liquid. Also, this further limits the actuator's operational frequency since higher frequencies may also cause liquid degradation, damage or denaturing. The transmission of a relatively high pressure to the liquid can lead to the formation of bubbles in the liquid which can undesirably cause dispensing inaccuracies, among other undesired operational complications.

Another disadvantage of such conventional devices is that the piezoelectric actuator is structurally bonded to the tube. Since many applications of dispensing using such devices involve the use of multiple liquids, such as, but not limited to, the fields of genomics and proteomics, among others, these devices fail to provide an efficient and cost-effective approach to a system involving handling of multiple liquids in small quantities, for example, biological and chemical reagents.

Typically, there are two options, neither one desirable, of addressing this situation. One is to simply discard the piezoelectric-tube device and use a new one for further processing of other liquids. The piezoelectric actuator is a relatively expensive component, and discarding it after a single use disadvantageously adds to the cost—given that some of the applications can involve the handling of hundreds or thousands, if not more, different liquids.

The second option is to rinse and clean the dispensing tube after each use to prevent contamination. Firstly, this undesirably adds additional steps to the liquid handling in terms of both efficiency and cost of the overall process. Secondly, in spite of any stringent rinsing or cleaning routines the risk of cross contamination always exists.

SUMMARY

It is one advantage of certain embodiments to provide systems, devices and methods comprising a piezoelectric dispenser or dispensing device that is configured so that the dispensing tube and piezoelectric actuator are separable. This allows for the removal and replacement of the tube for subsequent use. Desirably, such embodiments with a separable tube, not only eliminate the need for cleaning and the risk of contamination from left over material transferred from prior use, but also advantageously increase system efficiency and are cost-effective.

Certain embodiments provide longitudinal transducers or transmission devices, and related methods of operation, for transmission or conversion of radial motion to axial or longitudinal motion. The longitudinal transducer generally comprises a piezoelectric actuator coupled to a tube or the like. Actuation of the piezoelectric actuator by a voltage pulse causes radially inwards motion of the tube and generates an acoustic pressure or stress wave through the wall of the tube which results in axial or longitudinal motion, or displacement of the tube wall at the distal tip of the tube. In other words, actuation of the actuator causes the distal tip to axially extend and then axially retract back to its original form on deactivation of the actuator and/or its pulse, that is, the distal tip oscillates. When multiple pulses are provided, the distal tip oscillates in response to each pulse cycle.

Certain embodiments provide systems, devices and methods comprising a liquid dispenser or dispensing device that includes and/or incorporates a longitudinal transducer with a piezoelectric actuator, as disclosed herein, for transmission or conversion of radial motion to axial or longitudinal motion to a dispensing tube thereby causing a droplet to be dispensed from an aperture or outlet orifice at the distal tip of the tube. Some of these embodiments are configured so that the dispensing tube and piezoelectric actuator are separable, as disclosed herein.

Some advantages of the dispensing embodiments utilizing a longitudinal transducer include, but are not limited to: since minimal or negligible force, pressure is imparted to the liquid in the dispensing tube several of the problems associated with conventional dispensing devices, as described above, are mitigated or substantially eliminated—such as greater dispensing flexibility and independence substantially regardless of the liquid properties or characteristics, general avoidance of problems associated with degradation, damage and denaturing of the liquid and undesirable bubble formation, and ability to operate at higher frequencies, among others.

One exemplary application of the dispensers or dispensing devices disclosed herein relates to the production of DNA arrays for genetic engineering uses, wherein a high clone density is achieved by means of a small droplet size, for which piezoelectric operated dispensers in accordance with disclosed embodiments are particularly suitable. Embodiments can be particularly advantageous for production of working copies for screening processes, for example, in the pharmaceutical industry in production of microarrays or for the production of multiply assays.

Some embodiments provide a piezoelectric micro-dispensing device, apparatus or system that enables automatic or manual transfer of small volumes of liquids typically ranging in volume from picoliters to nanoliters. Advantageously, the device can allow for the disposal of the dispensing tube while permitting reuse of the piezoelectric actuator. Alternatively, or in addition, the device can desirably further comprise a longitudinal transducer for transmission or conversion of radial motion to axial or longitudinal motion to a dispensing tube thereby allowing for a liquid droplet to be dispensed from an aperture at the distal tip of the tube.

In some embodiments, the dispenser includes a main body portion or mounting bracket and comprises a tube which includes a dispensing nozzle at one end of the tube. The tube can comprise, for example, but not limited to, a glass capillary tube. The dispenser can further comprise a piezoelectric clamp for clamping to an outer circumferential or peripheral surface of the tube. The piezoelectric clamp can comprise two opposing jaws or clamping or supporting structures. The first jaw can include a piezoelectric actuator or transducer and the second jaw can include a preloading, clamping, retaining or biasing mechanism, device, assembly or structure to apply a predetermined reactive force to the tube.

In some embodiments, the preloading mechanism, device, assembly or structure includes a preloading screw. In other embodiments, the preloading mechanism, device, assembly or structure includes a preloading assembly of a spring, such as a leaf spring or the like, a mass providing ball or the like, and a knob or lever that is utilized to actuate or release the preloading.

In some embodiments, the clamp is operable to hold the tube in place and to transmit acoustic pressure to the clamped area of the tube on actuation of the piezoelectric actuator or transducer. Acoustic pressure or stress propagates longitudinally from the clamped area through the tube and toward the nozzle whereat axial displacement at the distal tip of the tube and/or transmission of acoustic pressure to the fluid in the area of the nozzle propels, ejects or dispenses a droplet of fluid having a predetermined volume or quantity, due at least in part to the solid-fluid interaction in the area of the nozzle. Thus, a wave passing longitudinally through the tube wall provides for transmission or conversion of tube radial motion to axial or longitudinal motion to the tube tip thereby allowing for a liquid droplet to be dispensed from an aperture at the tip of the tube. In some embodiments, this wave has a generally sinusoidal or cosine waveform, profile or configuration.

In some embodiments, following each use of dispensing a particular liquid the clamp may be released to replace the tube. As such, the tube may be disposed following each use with a particular liquid while the piezoelectric clamp is reused with another tube. Advantageously, this provides an economic utilization of the piezoelectric or piezoceramic actuator or transducer. In addition, and desirably, such an arrangement of a dispenser eliminates the need for cleaning the tube and the risk of cross contamination from left over material transferred from the prior use of the device.

Single droplets having a volume in the range from a few picoliters to a few nanoliters can be accurately and reliably dispensed, for example, in the range from about 50 picoliters to about 1,000 picoliters (1 nanoliter), including all values and sub-ranges therebetween.

In addition to dispensing droplets, fluid may also be acquired or aspirated into the tube. The fluid samples can be acquired, aspirated or drawn up into the tube by dipping its tip into a fluid source and applying vacuum, for example, using a pump or the like. The size of the tube can vary, as needed or desired, but is typically sufficiently small to draw fluid from a standard microtiter or micro-well plate, for example, one having a square or diametric dimension of about 5 mm or less.

The piezoelectric actuator, in some embodiments, comprises a monolithic co-fired ceramic stack which expands and contracts under the input of a pulsed DC voltage. The stack can be a linear or longitudinal stack which expands and contracts generally linearly or longitudinally in the direction of the stack. The piezoelectric or piezoceramic stack is capable of applying a predetermined force in the radial direction against the tube. To prevent breakage of the tube, the tube may be provided with a sleeve, for example, a plastic or metal sleeve, which substantially evenly distributes the force around the clamping area of the tube.

Some embodiments are directed to systems, devices, methods, and techniques are provided, for acquiring and dispensing predetermined volumes of liquids and, in particular, to a unique piezoelectric dispensing device for acquiring and dispensing of volumes of liquids, specifically, but not exclusively, for use in dispensing and transferring of small volumes of fluid in, for example, automatic or manual production of DNA arrays and assays, wherein droplets are dispensed in a single drop format with volumes, for example, ranging from about a few picoliters to several nanoliters. The dispensing devices or dispensers can advantageously utilize a disposable capillary tube assembly while desirably retaining the piezoelectric actuator or transducer for subsequent further uses, thereby mitigating the possibility of cross contamination of fluids and providing an economical and cost effective approach with reuse of the piezoelectric actuator or transducer for further operation such as with a variety of liquids to be dispensed and transferred. The systems or devices can incorporate a unique longitudinal transducer that transmits or converts radial tube displacement or motion to controlled axial or longitudinal displacement motion of a distal tip of the tube.

In some embodiments of the piezoelectric dispenser disclosed herein, the piezoelectric device does not completely surround, encircle or circumscribe the outer periphery of the dispensing tube, but does so only partially. In other words, the piezoelectric device is on a first side of the tube while the preloading device, when included, is on a second substantially opposed second side of the tube. In other embodiments, such as those not incorporating a configuration in which the dispensing tube is separable from the piezoelectric device, the piezoelectric device can substantially completely surround, encircle or circumscribe the outer periphery of the dispensing tube, or it can do so only partially.

In accordance with some embodiments, a dispenser for transferring a predetermined quantity of a liquid is provided. The dispenser generally comprises a tube, a piezoelectric device and a preloading device. The tube contains a liquid to be dispensed into or onto one or more targets. The piezoelectric device is selectively communicable with a first side of the tube and is responsive to an applied signal, and the preloading device is selectively communicable with a second side of the tube that is generally disposed in opposition to the first side, thereby allowing for separation of the tube and the piezoelectric device In some embodiments, the piezoelectric device is configured such that when actuated the piezoelectric device transmits a generally radial first force to the tube. Actuation of the piezoelectric actuator by a voltage pulse causes radially inwards motion of the tube and generates an acoustic pressure or stress wave through the wall of the tube which results in axial or longitudinal motion or displacement of the tube wall at the distal tip of the tube thereby causing a droplet of predetermined volume to be ejected from the tube. The preloading device, when included, can be configured to provide a generally reactive and opposed second force to the tube.

In accordance with some embodiments, a method of transferring a predetermined quantity of a liquid is provided. The method generally comprises providing a tube with a liquid to be dispensed and a piezoelectric device in communication with the tube. The piezoelectric device is actuated such that a generally radial force is applied to the tube and which creates a longitudinal stress or pressure wave that propagates to and causes axial displacement of a distal tip of the tube so as to eject a predetermined volume of the liquid. Advantageously, in some embodiments, the dispensing tube can be replaced with another tube for dispensing of another liquid.

In some embodiments, the dispensing systems, devices and methods disclosed herein may be used for the delivery of surfactants to neonate/local anesthetic in laparoscopy. In some embodiments, the dispensing systems, devices and methods disclosed herein may be used for the delivery of aerosolized pharmaceuticals to human or animal subjects. In some embodiments, the dispensing systems, devices and methods disclosed herein may be used for dispensing of chemicals for microelectronic manufacturing. In some embodiments, the dispensing systems, devices and methods disclosed herein may be used for printing inert inks onto surfaces, papers or the like, among others.

In accordance with some embodiments, a longitudinal transducer for converting a radial displacement to an axial displacement is provided. The longitudinal transducer generally comprises a tube, a linear or longitudinal piezoelectric actuator and an energy source. The tube has a length, a wall with a predetermined thickness, a lumen with a predetermined size or diameter, and a tip at a distal end of the tube. The linear or longitudinal piezoelectric actuator is clamped to the tube at a location proximal of the tip. The energy source is configured to provide at least one voltage pulse to the piezoelectric actuator. Actuation of the piezoelectric actuator causes a pressure wave to propagate from the proximal location of the tube toward the tip of the tube such that radial motion at the proximal location of the tube is transmitted as distally extending axial motion of the tip of the tube.

In one embodiment, the voltage pulse and configuration of the tube are selected such that a peak of the pressure wave is located substantially at the tip of the tube.

In accordance with some embodiments, a method of converting a radial displacement into an axial displacement is provided. The method involves providing a transducer that comprises a piezoelectric actuator which is responsive to a voltage signal. The piezoelectric actuator is actuated to provide a generally radial force to a tube of the transducer at a region that is proximal to a distal end of the tube. Radial motion of the tube at the proximal region of the tube is converted to generally axial motion at the distal end of the tube.

In one embodiment, actuation of the piezoelectric actuator comprises providing at least one voltage pulse to the piezoelectric actuator.

In one embodiment, the piezoelectric actuator comprises a linear or longitudinal piezoelectric actuator that is clamped to the tube.

In one embodiment, the axial motion comprises distal axial motion, and on deactivation of a pulse of the voltage signal the distal end of the tube is subjected to a motion in a proximal axial direction, thereby providing an axial oscillation in response to at least one pulsed voltage cycle.

In accordance with some embodiments, a dispenser for transferring a predetermined quantity of a liquid is provided. The dispenser generally comprises a tube a piezoelectric actuator. The tube contains a liquid to be dispensed into or onto one or more targets. The piezoelectric actuator is operatively coupled to the tube and is responsive to an applied signal for dispensing one or more droplets of the liquid. The tube and the piezoelectric actuator are separable such that the tube may be replaced while allowing for the same piezoelectric actuator to be used with another tube for dispensing another liquid.

In one embodiment, the piezoelectric actuator is mounted on a first side of the tube. In one embodiment, a preloading device is mounted on a second side of the tube which is generally opposed to the first side. In one embodiment, the preloading device comprises a screw. In one embodiment, the preloading device comprises an actuable spring loaded device. In one embodiment, the preloading device is releasable to allow for removal and replacement of the tube.

In one embodiment, actuation of the piezoelectric actuator causes conversion of a radial motion of the tube into an axial motion at a tip of the tube to cause a droplet of predetermined volume to be ejected from the tip.

In one embodiment, the piezoelectric actuator is spaced from the tube by a sleeve attached to the tube.

In one embodiment, the tube is part of a replaceable assembly that comprises the tube and a sleeve that is bonded to the tube.

In one embodiment, the dispenser further comprises a first jaw and a second jaw respectively engaged with the piezoelectric actuator and a preloading device. In one embodiment, the jaws comprise structures that engage a sleeve that is attached to the tube at a predetermined number of locations.

In one embodiment, a lumen of the tube has a generally annular configuration.

In one embodiment, the liquid to be dispensed within the tube is axially below the location of the piezoelectric actuator.

In one embodiment, the tube has an aperture plate with a generally curved funnel or conical configuration.

In one embodiment, the tube is part of a library of stored tubes with respective fluids pre-filled therein to allow for dispensing of multiple liquids while utilizing the same piezoelectric actuator.

In one embodiment, the dispenser is provided in combination with a fluid source that allows acquisition of liquid to be dispensed by the dispenser from the source.

In one embodiment, the dispenser is provided in combination with an imaging system to visualize and analyze dispensed droplets.

In one embodiment, the dispenser is provided in combination with a library of stored fluid samples that are selectively loadable within the tube.

In one embodiment, the piezoelectric actuator comprises a linear or longitudinal piezoelectric actuator that is clamped to the tube.

In accordance with some embodiments, a method of transferring a predetermined quantity of a liquid is provided.

The method involves providing a tube from which a liquid is to be dispensed and a linear or longitudinal piezoelectric actuator clamped to the tube. The piezoelectric actuator is actuated to eject a droplet of liquid from a distal tip of the tube. The tube is separated from the piezoelectric actuator and replaced with another tube for dispensing of another liquid while utilizing the same piezoelectric actuator.

In one embodiment, the tube is selected from a library of stored tubes with respective liquids pre-filled therein.

In one embodiment, the liquid to be dispensed is aspirated from a fluid source.

In one embodiment, a library of stored fluid samples that are selectively loadable within the tube is provided.

In one embodiment, a lumen of the tube has a generally annular configuration.

In one embodiment, actuation of the piezoelectric actuator causes conversion of a radial motion of the tube into an axial motion at a tip of the tube to cause a droplet of predetermined volume to be ejected from the tip.

In accordance with some embodiments, a dispenser for transferring a predetermined quantity of a liquid is provided. The dispenser generally comprises a longitudinal transducer, an aperture and a liquid. The longitudinal transducer generally comprises a tube and a piezoelectric actuator. The tube has a length, a wall with a predetermined thickness, a lumen with a predetermined size or diameter, and a tip at a distal end of the tube. The piezoelectric actuator is operatively coupled to the tube at a location proximal of the tip. The aperture is at the tip of the tube. The liquid is to be dispensed into or onto one or more targets and is loaded within the tube. Actuation of the piezoelectric actuator causes a pressure wave to propagate from the proximal location of the tube toward the tip of the tube such that radial motion at the proximal location of the tube is transmitted as distally extending axial motion of the tip of the tube, thereby causing a droplet of a predetermined volume to be ejected from the aperture.

In one embodiment, the piezoelectric actuator comprises a linear or longitudinal piezoelectric actuator that is clamped to the tube.

In one embodiment, the dispenser further comprises an energy source that is configured to provide at least one voltage pulse to the piezoelectric actuator In one embodiment, the tube and the piezoelectric actuator are separable.

In one embodiment, the tube is selected from a library of stored tubes with respective liquids pre-filled therein.

In one embodiment, a lumen of the tube has a generally annular configuration.

In one embodiment, the dispenser is provided in combination with a fluid source that allows acquisition of liquid to be dispensed by the dispenser from the source.

In one embodiment, the dispenser is provided in combination with a library of stored fluid samples that are selectively loadable within the tube.

In accordance with some embodiments, a method of transferring a predetermined quantity of a liquid is provided. The method involves providing a tube with a liquid to be dispensed. The tube comprises a distal end with a tip and an aperture thereat. A piezoelectric actuator is provided in communication with the tube at a location proximal to the tip of the tube. The piezoelectric actuator is actuated such that a pressure wave propagates from the proximal location of the tube toward the tip of the tube and radial motion at the proximal location of the tube is transmitted as axial motion of the tip of the tube, thereby causing a droplet of a predetermined volume to be ejected from the aperture.

In one embodiment, the piezoelectric actuator comprises a linear or longitudinal piezoelectric actuator that is clamped to the tube.

In one embodiment, the tube is replaced with another tube for dispensing of another liquid.

In one embodiment, the tube is selected from a library of stored tubes with respective liquids pre-filled therein.

In one embodiment, the liquid to be dispensed is acquired from a fluid source.

In one embodiment, a library of stored fluid samples that are selectively loadable within the tube is provided.

In one embodiment, a lumen of the tube has a generally annular configuration.

In one embodiment, the piezoelectric actuator is positioned axially above the liquid in the tube.

In accordance with some embodiments, a longitudinal transducer for converting a radial displacement to an axial displacement is provided. The longitudinal transducer generally comprises a tube, a linear or longitudinal piezoelectric actuator and an energy source. The tube comprises a generally rigid material and has a length, a wall with a predetermined thickness, a lumen with a predetermined size or diameter, and a tip at a distal end of the tube. The rigid material of the tube has a modulus of elasticity greater than about 10 GPa. The linear or longitudinal piezoelectric actuator is clamped to the tube at a location proximal of the tip of the tube. The energy source is configured to provide at least one voltage pulse to the piezoelectric actuator. Actuation of the piezoelectric actuator causes a pressure wave to propagate from the proximal location of the tube through the wall of the tube and toward the tip of the tube such that radial motion at the proximal location of the tube is transmitted as distally extending axial motion of the tip of the tube.

In one embodiment, the rigid material of the tube has a modulus of elasticity greater than about 50 GPa.

In one embodiment, an aperture is at the tip of the tube and a liquid to be dispensed into or onto one or more targets, by the actuation of the piezoelectric actuator, is contained in the tube. In one embodiment, the tube and the piezoelectric actuator are separable.

In accordance with some embodiments, a method of transferring a predetermined quantity of a liquid is provided. The method involves providing a flexible supply line. A liquid is supplied from the flexible supply line to a tube downstream of the flexible supply line. The tube comprises a distal end with a tip and an aperture thereat. A piezoelectric actuator is provided in communication with the tube at a location proximal to the tip of the tube. The piezoelectric actuator is actuated such that a pressure wave propagates from said location of the tube toward the tip of the tube and radial motion at said location of the tube is transmitted as axial motion of the tip of the tube, thereby causing a droplet of a predetermined volume to be ejected from the aperture.

In one embodiment, the coupling between the tube and the flexible supply line provides a self-aligning feature.

In one embodiment, the flexible supply line comprises a plastic or thermoplastic. In one embodiment, the flexible supply line comprises polypropylene (PP). In one embodiment, the flexible supply line comprises polyether ether ketone (PEEK).

In one embodiment, the flexible supply line has an inner diameter of about 750 μm or less. In one embodiment, the flexible supply line has an inner diameter of about 250 μm.

In one embodiment, the tube comprises an aperture plate that defines the aperture. In one embodiment, the aperture plate is gold plated. In one embodiment, the aperture plate is electro-formed. In one embodiment, the gold plated aperture plate is coated with self assembled monolayer (SAM). In one embodiment, the self assembled monolayer comprises Poly (ETHYLENE GLYCOL) methyl ether thiol CH3O(CH2CH2O)Nch2ch2SH.

In accordance with some embodiments, a dispenser for transferring a predetermined quantity of a liquid is provided. The dispenser generally comprises a longitudinal transducer, an aperture and a flexible supply line. The longitudinal transducer generally comprises a tube and a piezoelectric actuator. The tube has a length, a wall with a predetermined thickness, a lumen with a predetermined size or diameter, and a tip at a distal end of the tube. The piezoelectric actuator is operatively coupled to the tube at a location proximal of the tip. The aperture is at the tip of the tube. The flexible supply line is located upstream of the tube and is configured to supply a liquid to the tube that is to be dispensed into or onto one or more targets. The liquid is loaded within the tube. Actuation of the piezoelectric actuator causes a pressure wave to propagate from the proximal location of the tube toward the tip of the tube such that radial motion at the proximal location of the tube is transmitted as distally extending axial motion of the tip of the tube, thereby causing a droplet of a predetermined volume to be ejected from the aperture.

In one embodiment, the coupling between the tube and the flexible supply line provides a self aligning feature.

In one embodiment, the flexible supply line comprises a plastic or thermoplastic. In one embodiment, the flexible supply line comprises polypropylene (PP). In one embodiment, the flexible supply line comprises polyether ether ketone (PEEK).

In one embodiment, the flexible supply line has an inner diameter of about 750 µm or less. In one embodiment, the flexible supply line has an inner diameter of about 250 µm.

In one embodiment, the tube comprises an aperture plate that defines the aperture. In one embodiment, the aperture plate is gold plated. In one embodiment, the aperture plate is electro-formed. In one embodiment, the gold plated aperture plate is coated with self assembled monolayer (SAM). In one embodiment, the self assembled monolayer comprises Poly (ETHYLENE GLYCOL) methyl ether thiol CH3O(CH2CH2O)Nch2ch2SH.

In another embodiment, a dispenser for transferring a predetermined quantity of a liquid is disclosed. The dispenser includes a longitudinal transducer, including: a capillary tube having a tip at the distal end; a piezoelectric actuator operatively coupled to the capillary tube at a location proximal of the tip; an aperture at the tip of the tube; and a flexible supply line located upstream of the capillary tube and configured to couple to and supply the liquid to the capillary tube; where actuation of the piezoelectric actuator causes a pressure wave to propagate from said location of the capillary tube toward the tip of the capillary tube such that radial motion at said location of the capillary tube is transmitted as distally extending axial motion of the tip of the capillary tube, thereby causing a droplet of a predetermined volume to be ejected from the aperture; and wherein the capillary tube has a modulus of elasticity in a range of about 0.1 to $9.0 \times 10^6$ psi, and in some cases 0.1 to $1.5 \times 10^6$ psi, thereby dampening acoustical noise from the actuation and providing single drop stability over a range of drop sizes from about 50 to 1300 pL.

The coupling between the capillary tube and the flexible supply line may provide a self-aligning feature.

The operative coupling between the capillary tube and the piezoelectric actuator may be configured to allow replacement of capillary tubes and is adjustable to provide sufficient mechanical stability to reduce variations in droplet volumes between capillary tubes. In one embodiment, the operative coupling between the capillary tube and the piezoelectric actuator is a double V clamp.

In one embodiment, the capillary tube may include polyether ether ketone (PEEK).

In one embodiment, the capillary tube may include an aperture plate that defines the aperture. The aperture plate may be gold-plated nickel or sapphire.

A method for transferring a predetermined quantity of a liquid is disclosed in accordance with another embodiment. The method includes: coupling a flexible supply line to a capillary tube using a self-aligning feature; supplying liquid from the flexible supply line to the capillary tube, wherein the capillary tube comprises a distal end with a tip and an aperture thereat; coupling a piezoelectric actuator to the capillary tube at a location along the capillary tube, wherein the coupling between the piezoelectric actuator and the capillary tube is configured to allow replacement of capillary tubes and is adjustable to provide substantially uniform mechanical stability between the piezoelectric actuator and replaceable capillary tubes; actuating the piezoelectric actuator such that a pressure wave propagates from said location along the capillary tube toward the tip of the capillary tube and radial motion at said location is transmitted as axial motion of the tip, thereby causing a droplet of a predetermined volume to be ejected from the aperture; wherein the capillary tube has a modulus of elasticity in a range of about 0.1 to $9.0 \times 10^6$ psi, and in some cases 0.1 to $1.5 \times 10^6$ psi, thereby dampening acoustical noise from the actuation and providing single drop stability over a range of drop sizes from about 50 to 1300 pL.

In a variation, the method may further include adjusting the coupling between the piezoelectric actuator and the capillary tube to reduce variation in droplet volume between capillary tubes.

In another variation, the method may further include adjusting a piezoelectric voltage, a charge resistor, or both a voltage and a charge resistor to enable dispensing a range of liquid viscosities at the same predetermined droplet volumes.

For purposes of summarizing the disclosure, certain aspects, advantages and novel features have been described herein above. Of course, it is to be understood that not necessarily all such advantages may be achieved in accordance with any particular embodiment. Thus, aspects of the disclosure may be embodied or carried out in a manner that achieves or optimizes one advantage or group of advantages as taught or suggested herein without necessarily achieving other advantages as may be taught or suggested herein.

All of these embodiments are intended to be within the scope of the present disclosure. These and other embodiments will become readily apparent to those skilled in the art from the following detailed description having reference to the attached figures.

BRIEF DESCRIPTION OF THE DRAWINGS

Having thus summarized the general nature of the present disclosure and some of its features and advantages, certain embodiments and modifications thereof will become apparent to those skilled in the art from the detailed description herein having reference to the figures that follow, of which.

DETAILED DESCRIPTION

The embodiments described herein relate generally to systems and methods for acquiring and non-contact dispensing of predetermined volumes of liquids and, in particular, to unique piezoelectric dispensing devices for acquiring and dispensing of volumes of liquids, specifically, but not exclusively, for use in dispensing and transferring small volumes of fluid in, for example, automatic production of DNA arrays or multiple assays, wherein droplets are dispensed in a single drop format with volumes, for example, ranging from about a few picoliters to several nanoliters. Embodiments of the dispensing devices advantageously utilize a disposable, removable or separable capillary tube assembly while desirably retaining the piezoelectric actuator or transducer for subsequent further uses, thereby mitigating the possibility of cross contamination of fluids and providing an economical and cost effective approach with reuse of the piezoelectric actuator or transducer for further operation such as with a variety of liquids to be dispensed and transferred.

While the description sets forth various details of certain embodiments, it will be appreciated that the description is illustrative only and should not be construed in any way as limiting. Furthermore, various applications, and modifications thereto, which may occur to those who are skilled in the art, are also encompassed by the general concepts described herein.

Figure 1A:
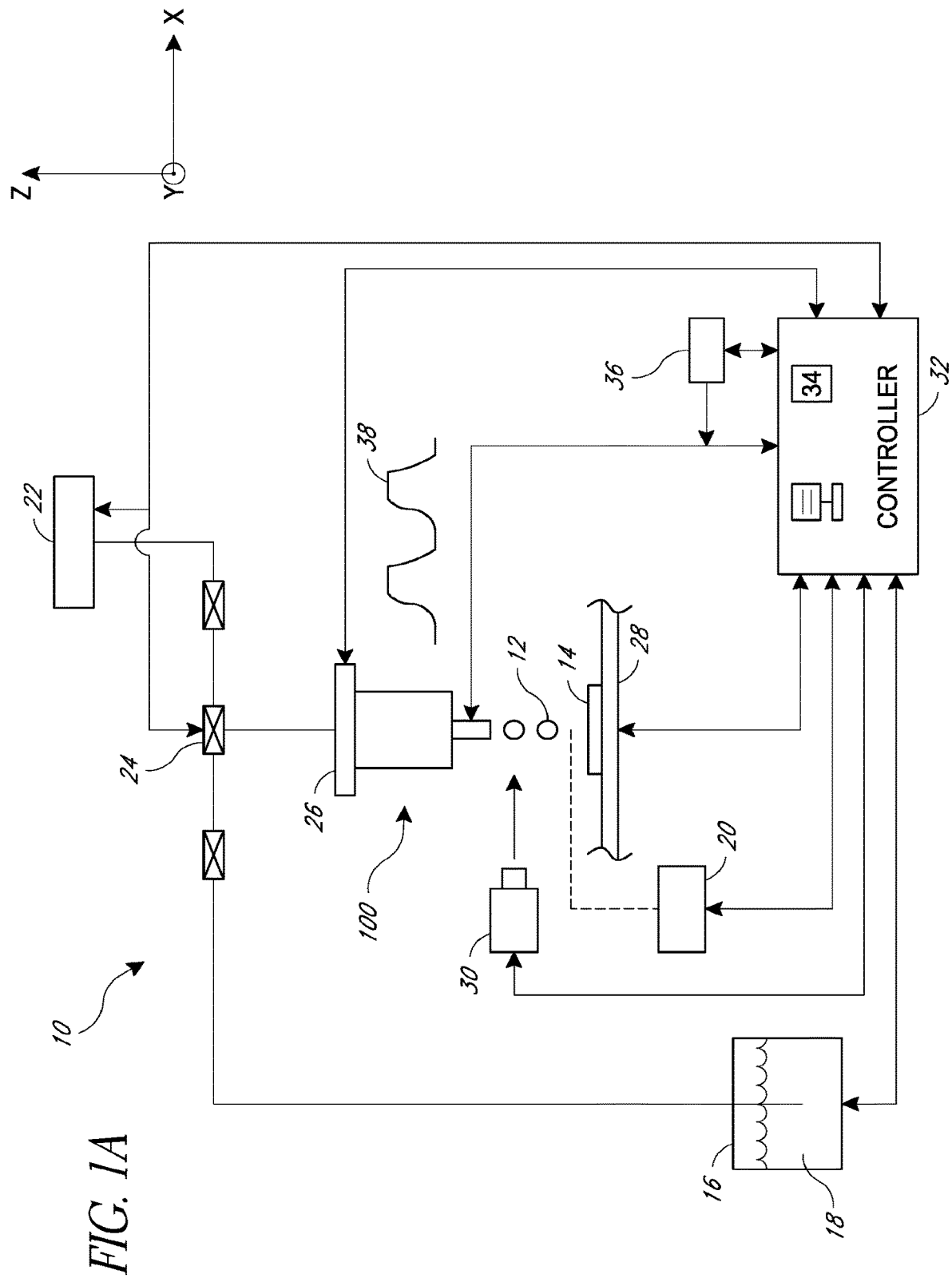
FIG. 1A is a simplified schematic view of a piezoelectric fluid dispensing system illustrating features and advantages in accordance with certain embodiments.

Turning now to the drawings, FIG. 1A illustrates a liquid dispensing (and aspirating or acquiring) system 10 for fluid handling and transfer in accordance with some embodiments. The system 10 generally comprises a piezoelectric dispensing device or dispenser 100 for dispensing single liquid droplets or drops 12 onto or into one or more targets or substrates 14 from a fluid or liquid source 16, such as a vessel or vial, among others, that holds or contains a liquid 18 to be dispensed The source 16 is in fluid communication with the dispensing device or dispenser 100 via, for example, a flexible tube or the like. The relative Z-direction positioning between the source 16 and the dispenser 100 (and its capillary tube) is selected giving consideration to a balance between the hydrostatic pressure head on the capillary tube, capillary forces and surface tension of the liquid 18 so that no liquid is emitted from the dispenser 100 unless actuated to do so. This balance also depends at least on the tube dimensions such as the size of the droplet emitting outlet orifice.

In some embodiments, the dispenser 100 is also utilized to aspirate or acquire liquid directly from a source 20 (e.g., vial, microtiter or micro-well plate and the like) by dipping the tip of the capillary tube into the liquid to be aspirated and applying a vacuum or suction to draw fluid into the tube. This can be done by using a vacuum source, pump 22 such as a positive displacement pump or the like. The system 10 can be arranged to accommodate both modes of acquiring the liquid to be dispensed (i.e., from the source 16 or the source 20), for example, by providing a two-way valve 24 or the like positioned as shown in FIG. 1A. Various other valves or the like may be provided in the system tubing to control fluid communication and flow, as needed or requires, with efficacy.

The liquids involved can include a wide variety wherein micro-volumes of fluid are to be handled, transferred and dispensed. These include, but not limited to, are liquids such as chemical and biological reagents, for example, DNA, cDNA, RNA, proteins, peptides, oligonucleotides, chromosomal formulations, and other organic or inorganic compounds, among others, or the like as known in the art.

The target or substrate 14 can comprise, for example, but not limited to, a microtiter or micro-well plate, glass slide, receptive membrane, test strip, vial or other suitable target, among others, or the like as known in the art.

Relative motion between the various components of the system 10 can be provided to accurately place, position and move them relative to one another. An X-, X-Y or X-Y-Z motion system 26 can be used to move the one or more dispensers 100 relative to the one or more targets or substrates 14, and/or the fluid or liquid sources 16 and 20 to provide the desired accuracy in dispensing and aspirating. For example, one or more suitable robot or robotic arms may be efficaciously used, as needed or desired, to provide the controlled relative motion The one or more targets or substrates 14 can be mounted on a carrier platform, table or carriage 28 to provide X-, X-Y or X-Y-Z motion. Robot or robotic arms may be utilized with efficacy, as required or desired. Similarly, relative motion of the fluid or liquid sources 16 and 20 can be controlled in a coordinated manner to allow for efficient liquid transfer. Web, reel or conveyor belt transport mechanisms can be efficaciously utilized to move any of the fluid targets or sources, as needed or desired.

In some embodiments, a droplet imaging system 30 is provided to analyze and visualize the dispensed droplet characteristics. These include, but are not limited to, the droplet volume, shape, sphericity, velocity, among others. This is not only useful during operation of the liquid handling system 10 but also initial system set-up for a particular application. For example, the imaging system 30 can be employed so that the various system operational parameters are fine tuned to the specific application. These parameters can then be adjusted to provide droplets having the required or desired properties.

The imaging system 30 can visualize and analyze droplets in flight. And, as such, cab adjust certain parameters, such as, but not limited to the, piezo-actuating voltage pulse profile, magnitude or frequency, and the like In one embodiment, the imaging system 30 comprises a high speed video instrument model JetExpert manufactured by ImageXpert Inc., Nashua, New Hampshire, U.S.A. which is used to analyze and visualize droplet characteristics or properties such droplet size, droplet velocity, among others.

The liquid handling system further comprises a control system or controller 32 to monitor and control system operation. Suitable software 34 is utilized for users to control the various system parameters and operations. The controller 32 can include or be interfaced with various sub-controllers, such as, the piezoelectric dispenser 100, control and electronics circuitry or module 36, and those of the various motion, imaging and fluid flow and dynamic systems, among others, as needed or desired, with efficacy. The electronics module or energy source 36 provides a pulsed voltage signal 38 to actuate the piezoelectric dispenser 100.

It is preferable to fine tune the pulsed voltage signal 38 such that it is not strictly in a square or rectangular format to avoid sudden impact with the dispensing tube, but rather such that it is adapted to desirably comprise smooth signal transitions. This can advantageously result in improved droplet structure, droplet volume control and the like. The electronics module or energy source 36 can be configured with an arrangement of resistors, capacitors and the like to ensure creation of such a preferred voltage signal 38. The smooth transition can be more advantageous when relatively larger droplets are to be dispensed.

Though FIG. 1A shows only a single dispenser 100, in other embodiments, it is contemplated that multiple dispensers in linear (1×N) or two-dimensional (M×N) arrays are used. These may be provided and operated either in parallel or in another coordinated fashion, as desired. It should be understood that any discussion herein with specific reference to the single dispenser embodiment is substantially equally applicable, with possible modifications as apparent to the skilled artisan, to multiple dispensers actuated by one or more piezoelectric actuators or transducers. In addition, fluid may be provided to multiple dispensers using a manifold configuration, as needed or desired. Moreover, the system 10 can be configured to provide on-the-fly dispensing of liquid droplets 12 as deemed suitable. For example, as disclosed in U.S. Pat. No. 6,063,339, the entirety of which is hereby incorporated by reference herein.

Figure 1B:
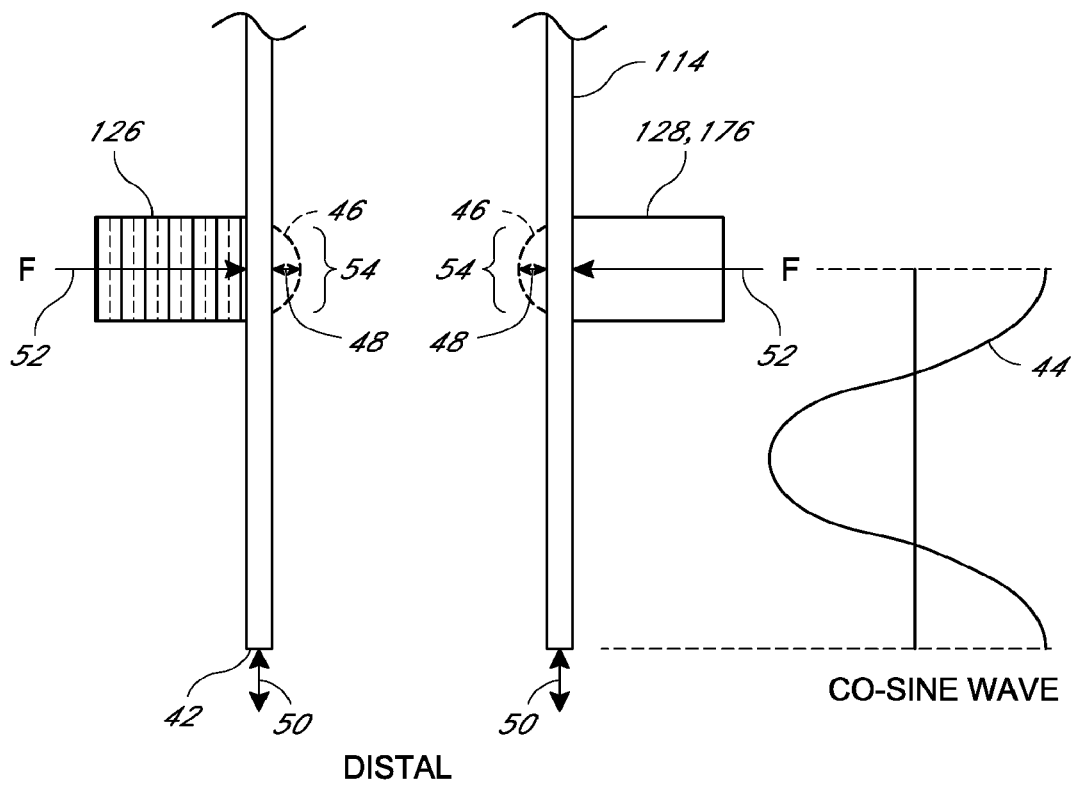
FIG. 1B is a simplified schematic view of a longitudinal transducer for transmission or conversion of radial movement to axial movement illustrating features and advantages in accordance with certain embodiments.

FIG. 1B illustrates a longitudinal transducer or transmission 40 in accordance with some embodiments. The longitudinal transducer 40 generally comprises a piezoelectric actuator or device 126 operatively coupled to a tube 114. The linear or longitudinal piezoelectric actuator 126 can be clamped to the tube 114, as discussed further below and herein.

The longitudinal transducer 40 can further comprise a preloading, clamping, retaining or biasing screw, mechanism, device, assembly or structure 128, 176 that allows for the tube 114 and piezoelectric actuator 126 to be separated, as discussed further below and herein. Optionally, the piezoelectric actuator 126 can be fixedly attached (e.g., bonded) to the tube 114 and the preloading device may be replaced by a fixedly attached support structure or the like to provide a reactive force to the force generated by the piezoelectric actuator 126. The piezoelectric actuator 126 can be on a portion or side of the tube 114 with the preloading device 128, 176 or support structure being on a generally opposed portion or side of the tube 114. Optionally, the piezoelectric actuator 126 can substantially completely surround, encircle or circumscribe the outer periphery of the tube 114. A sleeve, pad or the like may be provided intermediate the piezoelectric actuator 126 and the tube 114. Similarly, a sleeve, pad or the like may be provided intermediate the preloading device 128, 176 (or support structure) and the tube 114.

In operation, a voltage pulse (or alternating voltage) actuates the piezoelectric actuator 126 so that it expands and a generally radial force 52 is exerted or applied on the wall of the tube 114 at generally region 54 of the tube. The region 54 is spaced by a predetermined distance from a distal tip 42 of the tube 114. This radial force 152 causes a small deformation 46 and radial motion, displacement or movement 48 of the tube 114. Further, acoustic pressure or stress propagates or is transmitted axially or longitudinally from the region or area 54 of the tube 114, through the wall of the tube 114 and toward the tube tip 42 which undergoes distal axial or longitudinal motion, displacement or movement 50 in a direction extending away from the piezoelectric actuator 126 (motion in a distal, or negative or −Z direction). Thus, a stress or pressure wave 44 passes longitudinally or axially through the tube wall and provides for transmission or conversion of tube radial motion 48 to axial or longitudinal motion 50 at the tube tip 42. In some embodiments, the wave 44 has a generally sinusoidal or cosine waveform, profile or configuration.

On completion of one cycle, the tube 114 reverts back to its deactivated state with radially outward tube motion 48 and proximally retracting tube tip axial motion 50 in a direction extending toward the piezoelectric actuator 126 (motion in a proximal, or in a positive or +Z direction). When multiple pulses of an alternating voltage cause expansion and contraction of the piezoelectric actuator 126 the tube tip 42 undergoes multiple axial or longitudinal oscillations 50.

It should be appreciated, that various embodiments contemplate and utilize the balance between the voltage pulse (or alternating voltage), the configurations, arrangements, sizes and/or dimensions of the piezoelectric actuator 126 and tube 114 to provide a stress or pressure profile and wave form that results in a controlled and/or predetermined axial displacement or oscillation at the distal tip 42 of the tube 114.

The longitudinal transducer 40 may be utilized with any of the embodiments of the dispensers disclosed or suggested herein. These dispensers would generally comprise the longitudinal transducer 40 in combination with a liquid to be dispensed in the tube 114 and possibly a suitable nozzle or aperture plate to define an aperture or outlet orifice at the tube's distal tip 42. Thus, in operation, the dispensers can provide for droplet dispensing (such as drop-on-demand dispensing) wherein the tube tip longitudinal or axial oscillation or motion creates a suitable solid-liquid dynamic interaction to facilitate ejection of single droplets of a predetermined size.

Embodiments of the longitudinal transducers and/or dispensers disclosed herein can be thought of as providing q unique ultrasonic horn wherein the transmission of longitudinal acoustic waves is utilized to transmit and/or convert radial tube motion to controlled and predetermined axial motion of the tube.

Figure 2:
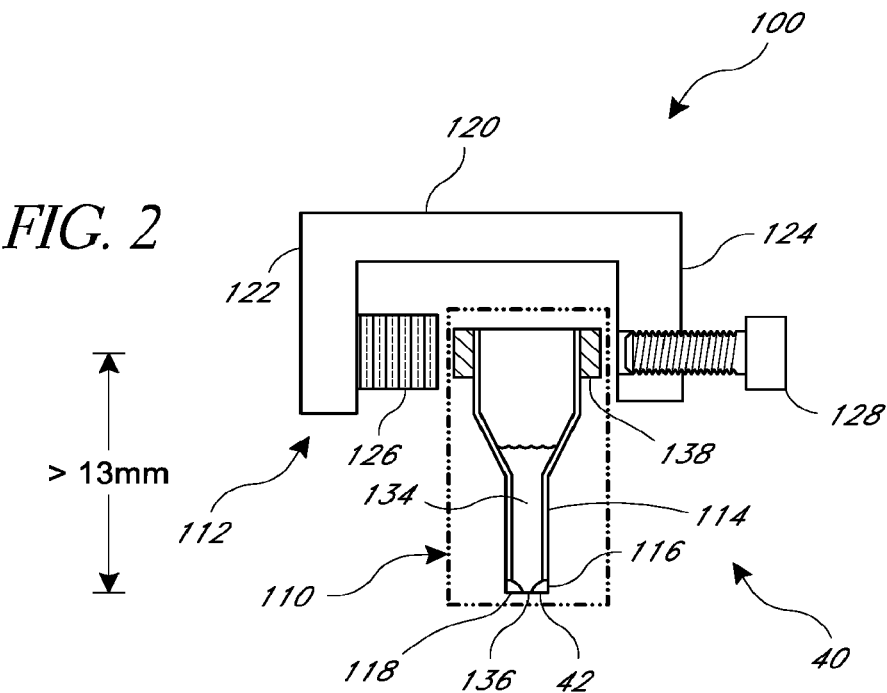
FIG. 2 is a simplified schematic side view of a piezoelectric fluid dispenser in an unclamped position illustrating features and advantages in accordance with certain embodiments.
Figure 3:
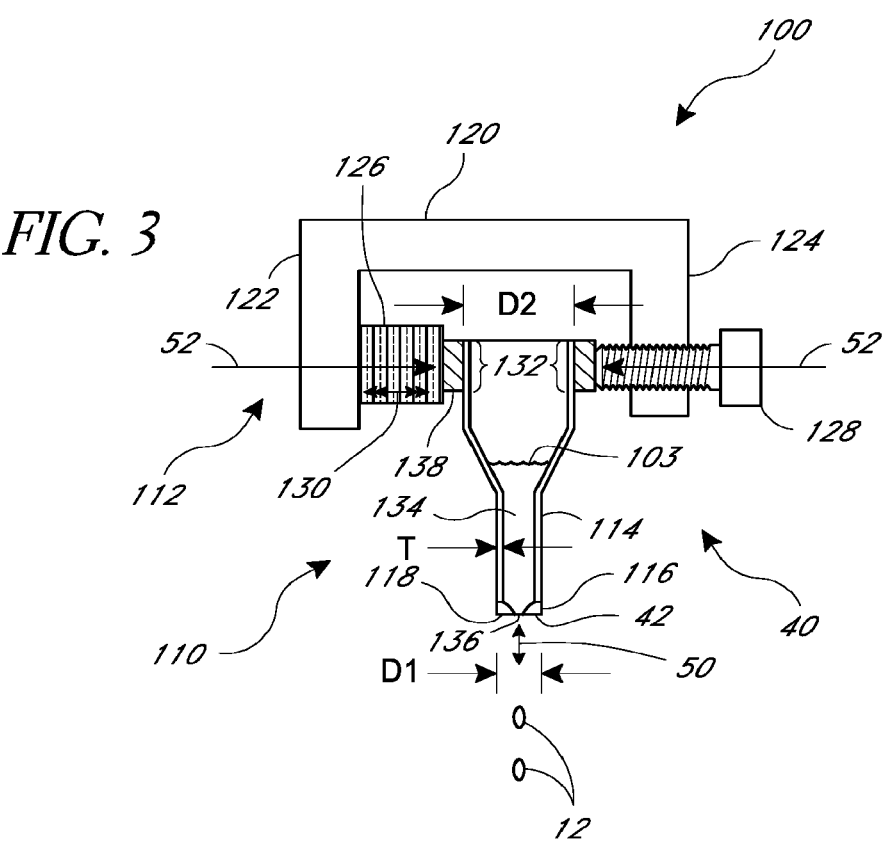
FIG. 3 is a simplified schematic side view of the piezoelectric fluid dispenser of FIG. 2 in a clamped position illustrating features and advantages in accordance with certain embodiments.

FIGS. 2 to 4 illustrate different views and/or arrangements of a piezoelectric dispensing device or dispenser 100 for fluid handling and transfer in accordance with some embodiments, with like reference numerals corresponding to like elements or structures. The dispenser 100 generally comprises, for illustrative purposes two assemblies, or sub-assemblies 110 and 112.

The first structure, arrangement, assembly or sub-assembly 110 (bounded by dashed lines, merely for illustrative purposes, in FIG. 2) comprises a capillary tube 114 and a dispensing nozzle 116 generally including an aperture or outlet orifice structure or plate 118. However, these are non-limiting descriptions such that the outlet 118 and nozzle 116 can be part of or incorporated into the tube 114 or assembly 110.

The second structure, arrangement, assembly or sub-assembly 112 can be viewed as, for example, but not limited to, a piezoelectric C-Clamp sub-assembly or the like that comprises a mount, support structure or bracket 120. The bracket 120 comprises a couple of opposed jaws or arms 122 and 124. A piezoelectric actuator, transducer, element, stack or assembly 126 is mounted on the first arm 122 and a preloading, clamping, retaining or biasing screw, mechanism, device, assembly or structure 128 is mounted on the second arm 124.

FIG. 3 illustrates the dispensing device or dispenser 100 in a preloaded or clamped position. The screw 128 is fastened and locks the capillary tube 114 in place by applying force in the radial direction of the tube 114 such that tube 114 is retained between the piezoelectric actuator, transducer or element 126 and the screw 128. (Further structural details of the preloading clamping jaws are discussed below with particular reference to FIG. 4, and show that in accordance with some embodiments respective opposing portions of respective jaws are positioned intermediate the piezoelectric element, the screw and the tube.)

The dispenser 100, in some embodiments, includes or incorporates the longitudinal transducer 40. This longitudinal transducer 140 can generally comprise the tube 114, piezoelectric actuator 126 and the clamping or preloading device 128. The piezoelectric actuator 126 can be a linear or longitudinal piezoelectric actuator 126 clamped to the tube 114.

Upon actuation of the piezoelectric actuator, transducer or element 126, such as by a voltage pulse or an alternating voltage, it expands and a pulse of force 52 is applied in a generally radial direction 130 toward the tube 114. The force 52 produces stress in the tube wall at the clamped preloaded region 132 of the tube 114. Stress or pressure in the region 132 produces an acoustic pressure or stress wave that propagates or is transmitted longitudinally through the wall of the tube 114 toward the nozzle aperture plate 118 and distal tip 42. This involves transmission or conversion of the radial inward motion to be transmitted in a form that results in a distally extending axial or longitudinal motion or displacement 50. This dynamic interaction between the solid wall of the tube 114 with the liquid at the aperture 136 causes an ejection of a droplet 12 of a predetermined size from the aperture 136. Stated differently, or in other words, or explained differently, transmission of acoustic pressure to the fluid or liquid in the region of the aperture plate 118, is at least partially responsible, for the propulsion or ejection of droplets 12 of fluid or liquid 134 through the aperture or outlet orifice 136.

Thus, the pressure or stress wave passing longitudinally through the tube wall provides a unique axial displacement of the distal tube tip 42, aperture plate 118 and/or aperture 136 for dispensing of single droplets 12. In some embodiments, this wave has a generally sinusoidal or cosine waveform, profile or configuration. After application of each pulse, the piezoelectric actuator, transducer or element 126 radially expands and axially contracts back to its original size thereby involving an oscillation or oscillatory motion of the tube tip 42.

The fluid or liquid 134 level 103 in the tube 114 may be at any point above or below the clamping area 132. With respect to the liquid level 103 being below the clamping area 132 and/or the piezoelectric actuator, provides a major advantage over conventional piezoelectric dispensing technology, wherein the liquid level has to be at least at the level of the piezoelectric or higher. Again, this translates into the advantages of the unique features of at least the longitudinal transducer 140 wherein transmission or conversion of radial motion to axial motion provides a new dimension of control for accurately dispensing predetermined quantities of fluid in the form of single droplets from a distal tip of the dispenser.

Desirably, in accordance with some embodiments, prior to droplet ejection, the balance between the hydrostatic pressure head, surface tension and capillary forces maintains the liquid 134 within the lumen of the tube 114 and substantially no liquid is adhesively suspended from the aperture or outlet orifice 136. The hydrostatic pressure head can be controlled, as needed or desired. (Optionally, the tube 114 can be open to the atmosphere or ambient conditions, as needed or desired.)

Accordingly, following each use the tube 114 may be removed and replaced by releasing preloading screw 128. The tube 114 may be disposed following each use, such as with a particular liquid, therefore eliminating the need for cleaning and the risk of contamination from material left over from a prior use.

In some embodiments, the tube 114 comprises glass. In some embodiments, the tube 114 comprises another rigid material that has a predetermined or preselected modulus of elasticity. In one embodiment, the material forming the tube 114 has a modulus of elasticity greater than about 10 GPa. In one embodiment, the material forming the tube 114 has a module of elasticity greater than about 50 GPa. A higher module of elasticity produces higher stress in the tube wall since the stress is a product of the elasticity and the deformation. This higher stress desirably results in a higher amplitude of oscillation of the capillary tube 114.

The capillary tube assembly 110 can comprise a sleeve 138 or the like that substantially surrounds or circumscribes the tube 114. The sleeve 138 desirably distributes the force imposed by the piezoelectric actuator, transducer or element 126 and prevents stress concentration locally or in one spot which may cause breakage of the tube 114, such as one made of glass, other rigid material or the like.

The sleeve 138 can comprise a variety of suitable materials. In one embodiment, the sleeve 138 is made of a metal or alloy such as stainless steel, brass or aluminum, or the like, among others. In another embodiment, the sleeve 138 is made of a plastic such as Delrin®, or the like, among others.

The sleeve 138 is bonded to the capillary tube 114 by a structural epoxy such as, but not limited to, LOCTITE® Hysol® type E-30CL. Thus, the capillary tube assembly 110 comprising the tube 114 and the sleeve 138 is separable from the dispenser 100 and disposable.

The aperture plate 118 can, in some embodiments, be bonded to the tube 114 and can be manufactured by electroforming. In one embodiment, the nozzle aperture plate 118 comprises or is made of electroformed nickel or electroformed palladium nickel. Optionally, the aperture plate 118 may be plated by inert material such as titanium nitride or the like with efficacy, as needed or desired. In one embodiment, the aperture plate 118 comprises synthetic sapphire, ruby or the like. The aperture plate 118 may be gold plated. In one embodiment, the thickness of the aperture plate 118 can be in the range of about 60 microns (μm), though higher or lower thicknesses may be efficaciously utilized, as required or desired.

As shown in the drawings, in some embodiments, the aperture plate 118 has a funnel-like, conical, frusto-conical structure or the like with a curvature that defines a first larger size or diameter at an upstream end and a second smaller size or diameter at a downstream end, that is, at the aperture or outlet orifice 136. Advantageously, such a configuration can provide improved consistency in control of the droplet size and mitigation of "dead" fluid spots or regions. Moreover, this desirably results in improved overall system operation.

The piezoelectric or piezoceramic actuator, transducer or element 126 can comprise a co-fired monolithic linear or longitudinal stack which expands and contracts, generally linearly or longitudinally in the direction of the stack, under the input of an alternating voltage. In one embodiment, the piezoelectric or piezoceramic actuator, transducer or element 126 is manufactured by NEC part No. AE0203D04Fas sold by THORLAB. Inc, Newton, New Jersey, U.S.A.

The clamping or preloading force of the piezoelectric actuator 126 can be varied based on the input voltage signal as well as the configuration of the piezoelectric device itself. In one embodiment, the maximum clamping force of the actuator 126 is in the range of about 200 Newton, though clamping forces below about 2 Newton and above about 250 Newton may be efficaciously utilized, as required or desired.

The clamping or preloading force of the clamping screw 128 can be varied based on the device and screw configuration. In one embodiment, the clamping screw 128 provides a preloading or clamping force of in the range from about 30 Newton to about 70 Newton, including all valued and sub-ranges therebetween, though higher or lower forces may be provided, as needed or desired. The screw 128 can be locked using a torque limiting screw driver which limits the linear force to a predetermined value, such as, but not limited to 70 Newton.

As discussed above with particular reference to FIG. 1A, the dispenser 100 may be used to acquire fluid or liquid samples as well as dispense fluid or liquid droplets. Acquiring samples is done by submerging the capillary tube 114 in a fluid sample and applying vacuum, suction or the like.

Capillary tube 114 has a generally tubular axis-symmetric shape with a generally thin wall having a thickness T as labeled in FIG. 2. In one embodiment, the thickness T is in the range from about 0.1 mm to about 0.5 mm, including all values and sub-ranges therebetween. In one embodiment, the length of the capillary tube 114 is about 25 mm and the distance of the tube aperture from the clamping point, location or region is desirably greater than about 13 mm such that the capillary tube can be conveniently submerged in a standard laboratory 10 mm deep well plate. Of course, these dimensions can be efficaciously modified to accommodate differently configured well plates, micro-titer plates and the like, among others, as required or desired.

In another embodiment, the thickness T is in the range from about 0.1 mm to about 0.3 mm, including all values and sub-ranges therebetween. Of course, higher or lower tube wall thicknesses may be provided with efficacy, as needed or desired. Advantageously, in accordance with certain embodiments, the generally thin wall structure of the capillary tube 114 allows for the piezo-induced stress to be substantially transmitted to the tube wall in a longitudinal manner as opposed to into the liquid therein, thereby providing additional control on the droplet ejection and the goal of achieving droplet sizes in the low picoliter range. Moreover, the relatively thin tube wall allows for a low piezoelectric force to be applied thereat such that the low force creates a sufficiently high tube wall stress or pressure with a low radial tube bending and a controlled axial tube displacement or oscillation, while minimizing transmission of compression pressure/stress to the liquid in the tube at the region of application of the radial force.

Typically, the tube 114 and its lumen have a generally circular cross-section. However, the cross-section of the tube 114 and its lumen may have other shapes, such as, but not limited to square or hexagonal cross sectional shapes.

In one embodiment, the tube 114 may have two unequal outer diameters at each end labeled D1 and D2 in FIG. 2 with D2 being greater than D1. In another embodiment, the tube 114 may have an even diameter through its length. Diameter D1 may be in the range from about 1 mm to about 5 mm and diameter D2 is generally smaller than about 9 mm. Of course, larger or smaller diameters may be provided with efficacy, as needed or desired. In some embodiments, larger opening or diameter D2 may be used for storage of fluid or liquid sample, such as DNA samples, as discussed further below.

In one embodiment, a pulsating electrical signal at a frequency in the range from about 10 Kilohertz (KHz) to about 100 KHz is provided to the piezoelectric or piezoceramic actuator, transducer or element 126 to produce ejection of single droplets from the produces ejection of droplets 12 from the nozzle aperture plate 118. In other embodiments, higher or lower frequencies may be utilized with efficacy, as needed or desired.

The time of actuation (or expansion) of the piezoelectric or piezoceramic actuator, transducer or element 126 depends on various factors, such as, but not limited to, the system or device configuration, dimensioning and droplet size. In some embodiments, this time is of the order of a microsecond (μsecond) up to about in the range of tens or hundreds of microseconds (μseconds), as required or desired. Of course, higher or lower actuation times may be utilized with efficacy.

Typically, a single oscillation cycle ejects a single droplet 12 which has a droplet diameter that is substantially equal to the diameter of the aperture or outlet orifice 136. Thus for example, a 50 micron (μm) aperture size or diameter produces a droplet with a diameter of about 50 microns (μm) and having a volume of about 65 picoliters (pL). Similarly, an aperture of 70 μm produces a droplet with a volume of about 180 pL.

Fluids or liquids can be dispensed one droplet or drop at a time in a "drop-on-demand" mode at frequencies up to and in the range of about 1,000 drops per second. The dispensing device or dispenser 10) may be used in the production of arrays, such as DNA microarrays and the like, and multiple assays. The placement of the droplets 12 on a target or substrate can be controlled, for example, by a programmable positioning table which may move along the three axis (X, Y and/or Z) of a Cartesian or equivalent coordinate system, as discussed above and with particular reference to FIG. 1A.

Figure 4A:
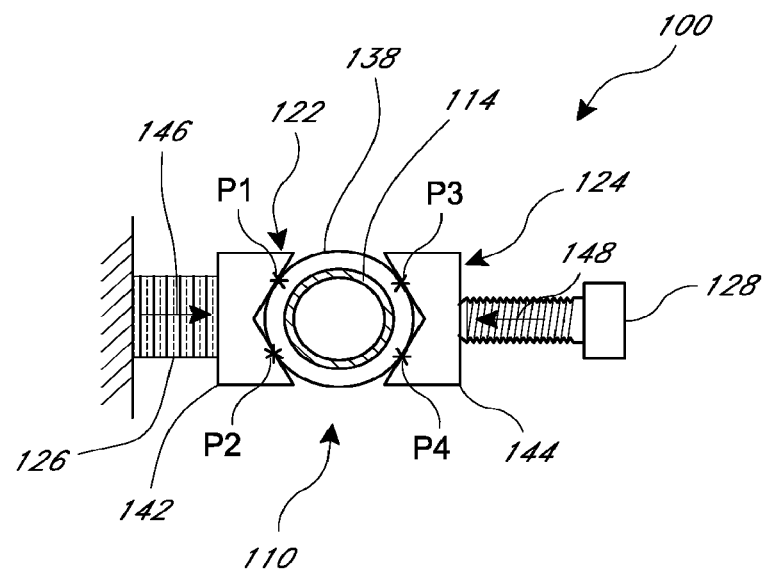
FIG. 4A is a simplified schematic top view of the piezoelectric fluid dispenser of FIG. 3 illustrating features and advantages in accordance with certain embodiments.

FIG. 4A illustrates a more detailed top view of the clamping area of the tube 114 and engaging structural portions 142 and 144 of respective jaws or arms 122, 124. This drawing also shows the tube 114, the piezoelectric device 126, the clamping screw 128, and the sleeve 138. In one embodiment and as illustrated, the clamping jaw portions 142 and 144 have a generally V shape and which have four interface points P1, P2, P3 and P4 with the sleeve 138. This configuration can advantageously contribute to and enhance a generally balanced and even distribution of the stress in the clamped region of the tube 114.

The angle of the "V" shape may be efficaciously varied such that it can be greater or less than a right-angle (90 degrees) configuration. The number of interface points may also be varied, as needed or desired.

Clamping jaw portions 142 and 144 may optionally have a curved, arced or arcuate shape with a radius of curvature that is equal to or greater than the radius of (curvature) of the sleeve 138. Of course, other configurations may be practiced in accordance with embodiments disclosed, taught or suggested herein. Arrows 146 and 148 schematically depict the clamping, preloading and/or piezo actuation forces.

Figure 4B:
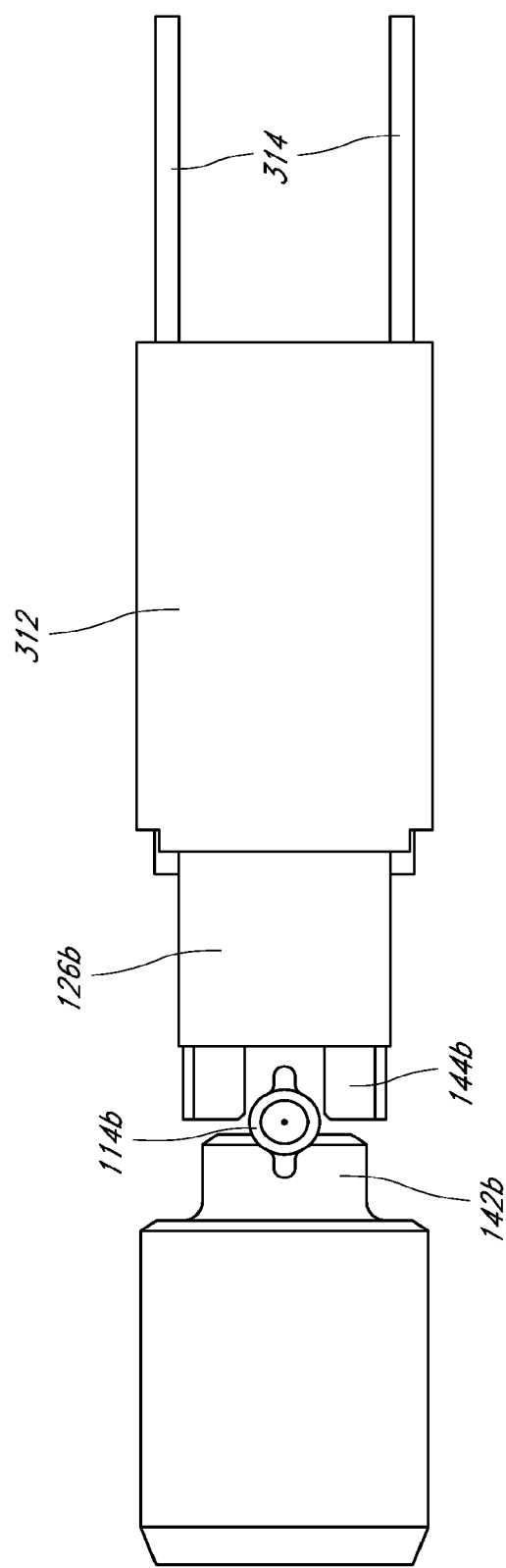
FIG. 4B is a simplified schematic top view of the piezoelectric fluid dispenser illustrating another embodiment of the double V clamp configuration of FIG. 4A.

FIG. 4B illustrates a detailed top view of an alternative configuration of the V shaped coupling that is shown in FIG. 4A. The capillary tube 114b is shown clamped between a front V block 142b and a rear V block 144b. The piezoelectric actuator 126b is coupled to the rear V block 144b. A mounting block 312 is shown connected to the piezoelectric actuator 126b. The mounting block 312 may serve as a heatsink in some embodiments. Electrical leads 314 are illustrated entering the mounting block 312.

Figure 5A:
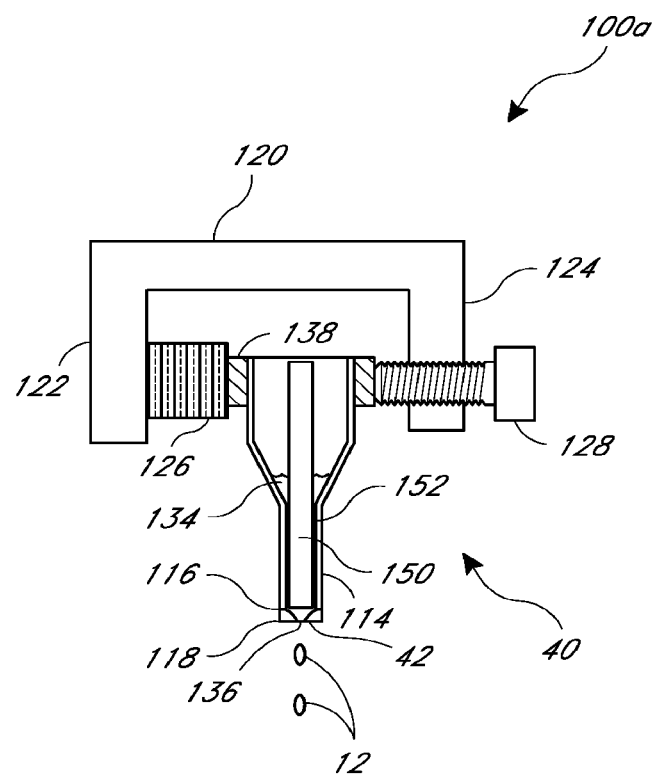
FIG. 5A is a simplified schematic side view of a piezoelectric fluid dispenser incorporating a tube with an annular gap illustrating features and advantages in accordance with certain embodiments.

FIG. 5A illustrates an arrangement of a piezoelectric dispensing device or dispenser 100a for fluid handling and transfer in accordance with some embodiments, with like reference numerals corresponding to like elements or structures, which utilize a capillary tube 114 with a generally annular gap 152. This annular gap 152 is provided between the tube 114 and a concentric core member 150 which would typically have, but not limited to, a cylindrical structure.

Many configurations and sizes of the gap 152 can be contemplated in accordance with embodiments of the dispenser 100a. For example, if the internal diameter of the tube 114 is about 1 mm, then the outer diameter of the core member 150 can be about 0.9 mm, thereby providing a radial gap of about 0.05 mm between the tube 114 and the core member 150 which defines the size of the annular capillary gap. One advantage of such an annular gap 152 configuration is that it can assist in reducing the hydrostatic pressure head that acts against or on the nozzle aperture plate 118 and/or the aperture or orifice outlet 136 relative to the capillary forces and surface tension involved. Desirably, this can result in more consistency, accuracy and reliability in dispensing of a particular or predetermined droplet size.

Moreover, the piezoelectric dispenser 100a further distinguishes over conventional devices which employ acoustic pressure wave propagation through the liquid for droplet dispensing. The droplet dispensing operation of the dispenser 100a is substantially independent of how the liquid 134 is loaded within the tube 114. At least one reason for this is that a longitudinal transducer 140 is utilized which converts radial tube motion to axial tube displacement at the distal tube tip 42 and/or the dynamic interaction between the solid wall of the tube 114 with the liquid at the aperture 136.

Figure 5B:
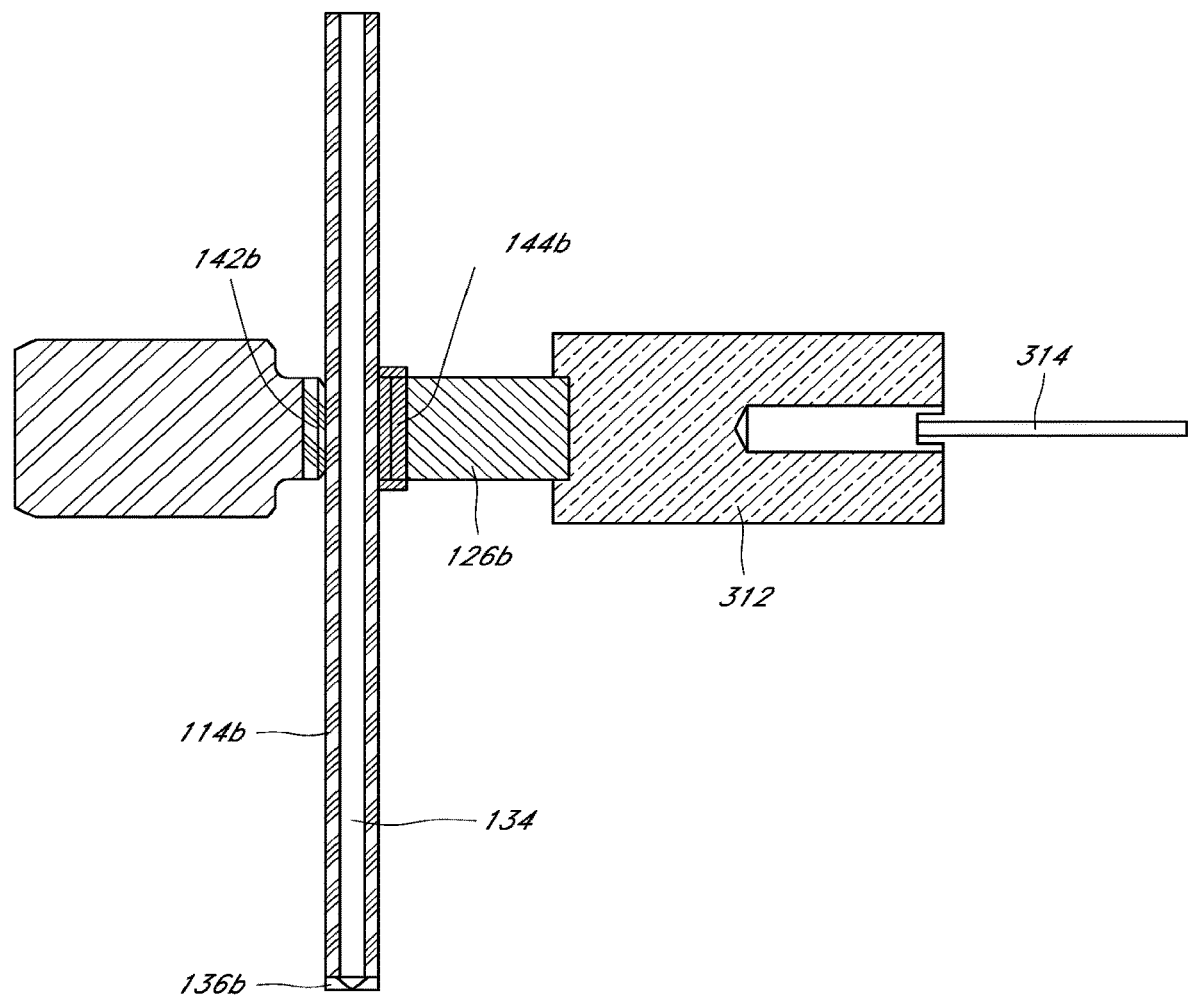
FIG. 5B is a simplified schematic side view of a piezoelectric fluid dispenser incorporating a tube showing another configuration of the dispenser shown in FIG. 5A.

FIG. 5B is a simplified schematic side view of a piezoelectric fluid dispenser incorporating a tube showing another configuration of the dispenser shown in FIG. 5A. A top view of this same configuration is illustrated in FIG. 4B. In addition to the previously described components and features, the side view also shows the fluid column 134b and the capillary aperture 136b.

Figure 6A:
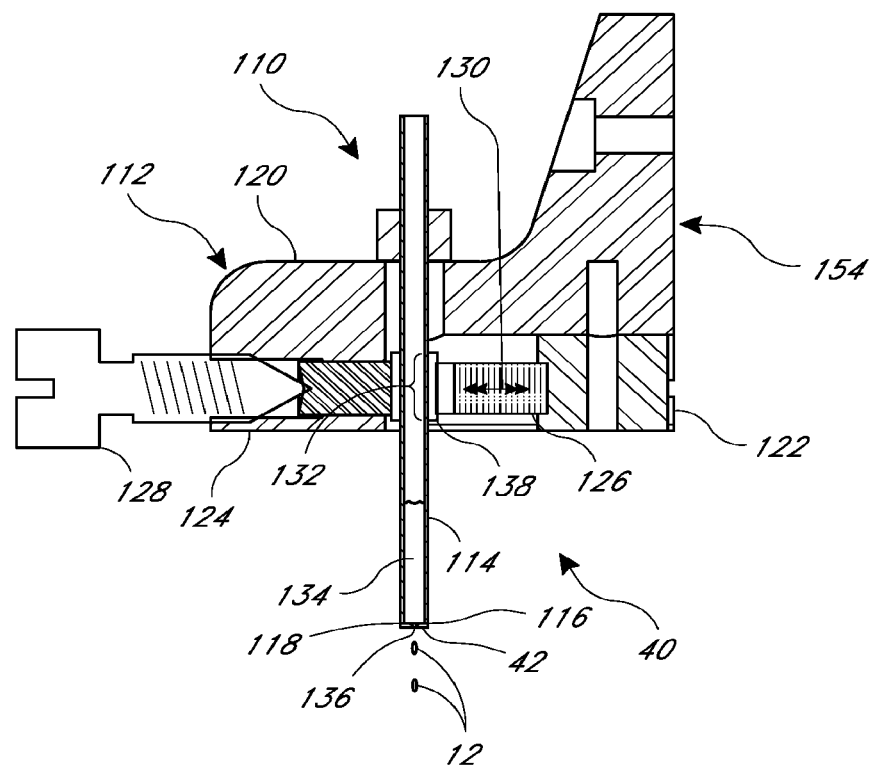
FIG. 6A is a simplified schematic side view of a piezoelectric fluid dispenser incorporating a mounting bracket suitable for dispensing of fluid in the production of dot arrays or the like illustrating features and advantages in accordance with certain embodiments.

FIG. 6A illustrates an arrangement of a piezoelectric dispensing device or dispenser 100b for fluid handling and transfer in accordance with some embodiments, with like reference numerals corresponding to like elements or structures, which utilize a main body portion or bracket 154 and that can be particularly advantageous in dispensing of fluids or liquids suitable for in production of dot arrays or assays, among other applications as disclosed, taught or suggested herein.

The dispensing device or dispenser 100b generally comprises a capillary tube assembly 110 that includes a tube 114 and a piezoelectric clamp assembly 112. The tube 114 includes a dispensing nozzle 116 generally defined by an aperture plate 118. The clamp assembly 112 can include a mounting bracket 120 that can be part of the main body portion 154 or incorporated therein. The bracket 120 has a first jaw or arm 122 that includes the piezoelectric or piezoceramic actuator, transducer or element 126 while a second jaw or arm 124 includes the preloading mechanism or screw 128. The screw 128 preloads the tube 114 against the piezoelectric device 126 such that the tube is desirably locked or fixtured in place between the piezoelectric device 126 and the screw 128 in a manner as is described herein. The main body portion 154 can have various structural features that allow for the assembly of the dispensing system including, but not limited to, connection, attachment and coupling devices or the like, among others.

As taught herein, the piezoelectric device 126 expands and contracts in the direction 130 in response to an alternating electrical voltage which, in accordance with certain embodiments, can be in the range of about 50 volts (such as in the range from, but not limited to, about 59 or less to about 62 or more volts) at a frequency of about 30,000 Hertz (Hz). This displacement of the piezoelectric actuator, transducer or element 126 produces one or more pulses of force in the radial direction 130 toward the tube 114. This force produces stress in the clamping region 132 of the capillary tube 114. This stress generates a wave which propagates longitudinally through the tube wall toward the nozzle aperture plate 118 wherein transmission of acoustic pressure to the fluid or liquid 134 in the region of the aperture plate 118 (via solid-fluid/liquid interaction) propels a droplet 12 of fluid through the aperture or outlet orifice 136. As also discussed above and herein, the stress/pressure wave passing longitudinally through the tube wall provides a unique oscillating distal tube tip 42, aperture plate 118 and/or aperture 136. In some embodiments, this wave has a generally sinusoidal or cosine waveform, profile or configuration.

Figure 6B:
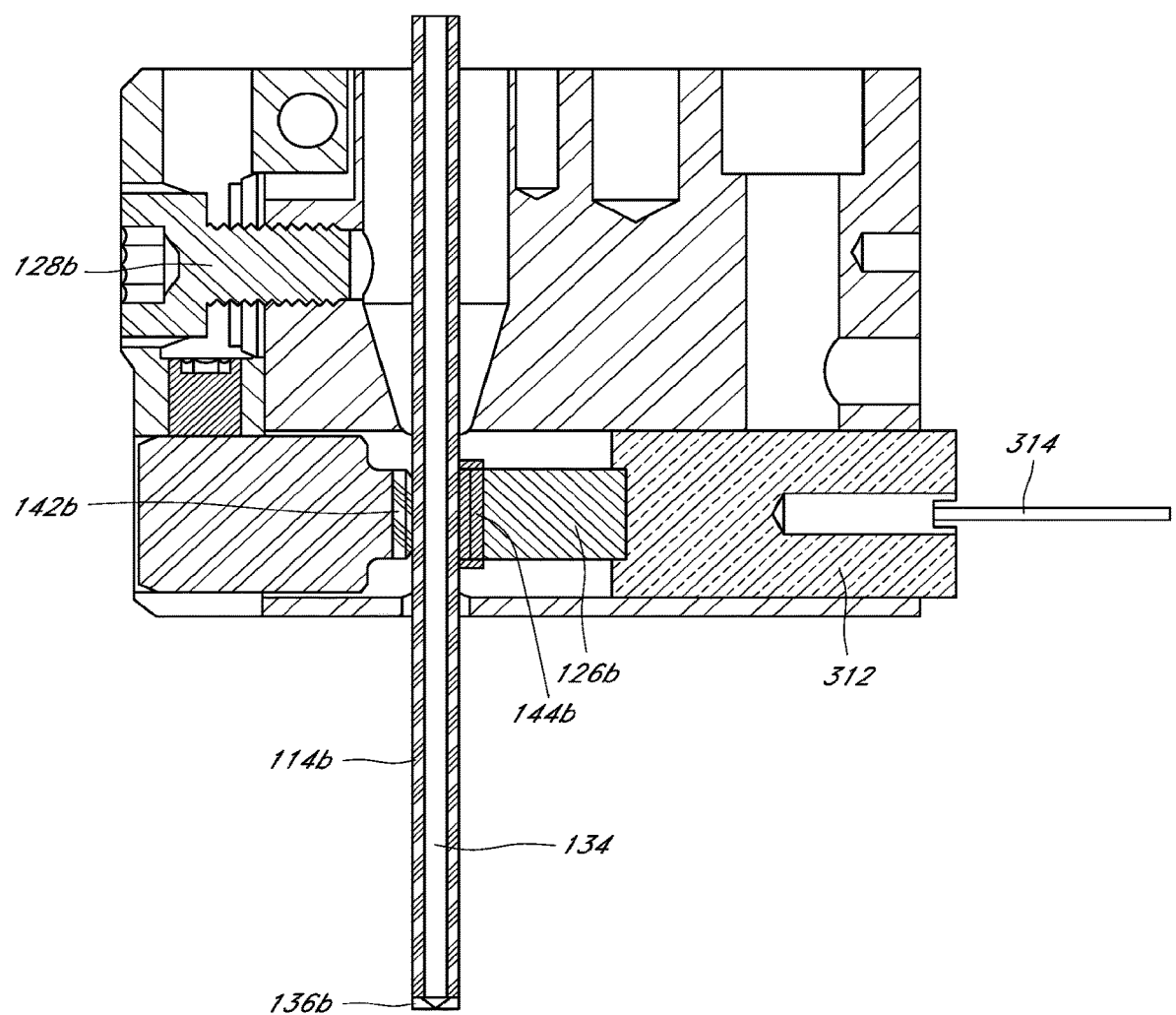
FIG. 6B is a simplified schematic side view of a piezoelectric fluid dispenser incorporating a mounting bracket suitable for dispensing of fluid in the production of dot arrays or the like illustrating another configuration of the dispenser shown in FIG. 6A.

FIG. 6B is a simplified schematic side view of a piezoelectric fluid dispenser incorporating a mounting bracket suitable for dispensing of fluid in the production of dot arrays or the like illustrating another configuration of the dispenser shown in FIG. 6A. A top view of this same configuration is illustrated in FIG. 4B. In addition to the previously described components and features, the side view in FIG. 6B also shows the adjustment screw 128b.

Figure 7:
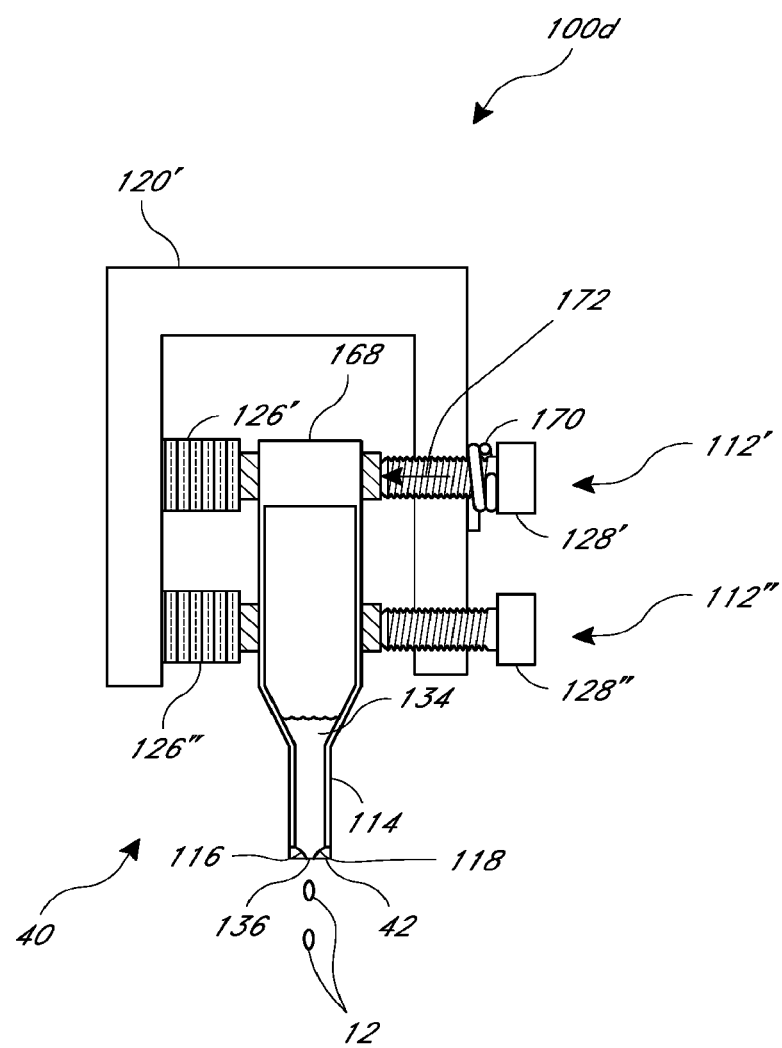
FIG. 7 is a simplified schematic side view of a piezoelectric fluid dispenser with multiple clamping devices illustrating features and advantages in accordance with certain embodiments.

FIG. 7 illustrates an arrangement of a piezoelectric dispensing device or dispenser 100d for fluid handling and transfer in accordance with some embodiments, with like reference numerals corresponding to like elements or structures, which include a plurality or multiplicity of piezoelectric clamps or assemblies, such as 112' and 112". The dispenser or dispensing device 100d and/or the respective assemblies 112' and 112" generally comprise two sets of piezoelectric clamps, elements, transducers or elements 126', 126" which are operatively coupled to respective two preloading clamping screws 128', 128". A bracket or main body portion 120' comprises part of the device.

The piezoelectric dispensing device or dispenser 100d includes the tube 114 which is closed at one end 168 and forms a shape of a vial (e.g., comprising glass) which can be used for storage of fluid or liquid samples.

In some embodiments, the screw 126' can be provided with a resilient member such as a spring 170, for example, a torsion spring or the like. The torsion spring 170 can be biased in a clockwise direction, or alternatively a counter-clockwise direction, to apply a substantially constant torque on the screw 112' such that the radial (or axial if viewed relative to a X-Y-Z Cartesian coordinate system)/force 172 applied by the screw 128' remains substantially constant during operation of the dispensing device or dispenser 100d.

Advantageously, the torsion spring 170 can prevent accidental damage which may be caused by manually over tightening of the screw 128". In one embodiment, but not limited to, an M5-0.8 screw may be used in conjunction with the torsion spring 170 to apply a predetermined torque, for example, of about 0.03 Nm in a clockwise direction to produce a radial/linear force 172 of about 70 Newton.

FIGS. 8-11 illustrate different views and/or arrangements of a piezoelectric dispensing device or dispenser 100e for fluid handling and transfer in accordance with some embodiments. The dispenser 100e generally comprises a main body portion or bracket 174, a capillary tube 114, a piezoelectric actuator, transducer or element 126, and a preloading, clamping, retaining or biasing mechanism, device, assembly or structure 176 that can clamp the linear or longitudinal piezoelectric actuator 126 to the tube 114.

Figure 8A:
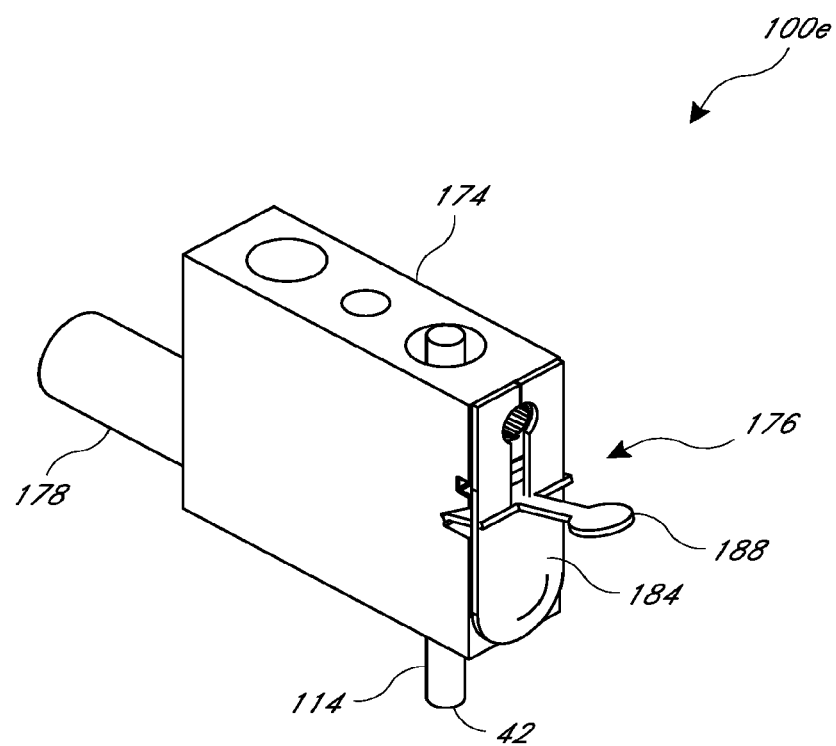
FIG. 8A is a simplified perspective view of a piezoelectric fluid dispenser incorporating a spring biased preloading mechanism illustrating features and advantages in accordance with certain embodiments.

FIG. 8A is a simplified perspective view of a piezoelectric fluid dispenser incorporating a spring biased preloading mechanism illustrating features and advantages in accordance with certain embodiments.

Figure 8B:
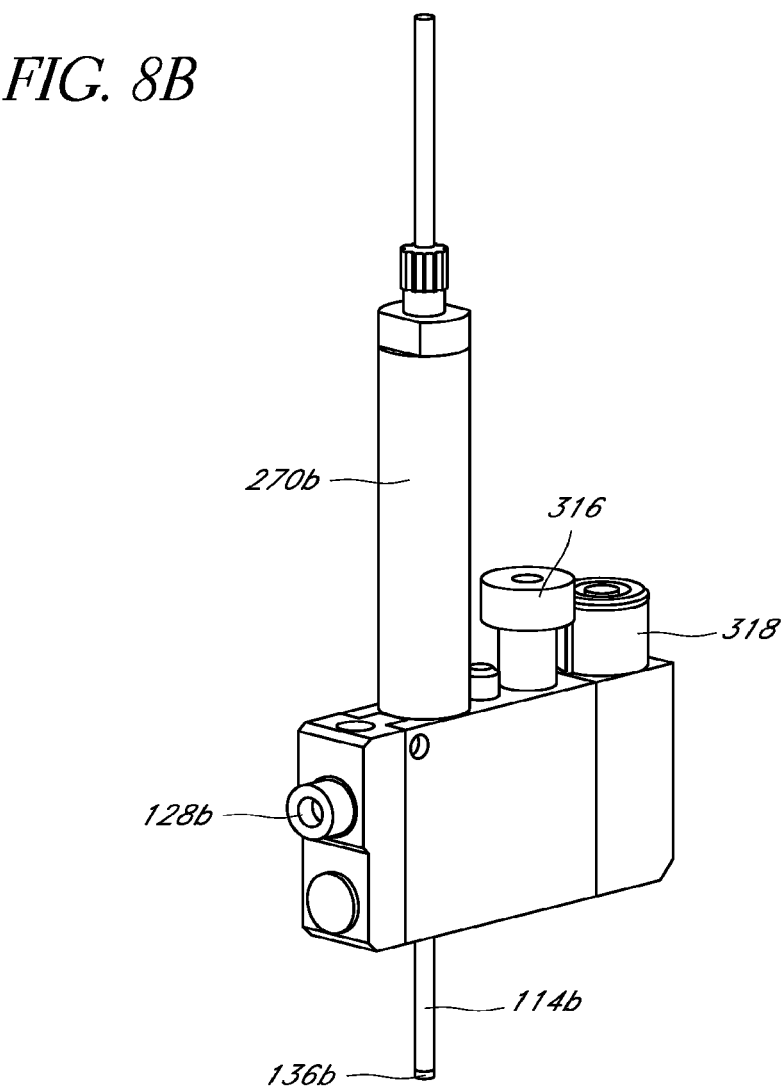
FIG. 8B is a simplified perspective view of a piezoelectric fluid dispenser illustrating an alternative configuration of the dispenser in FIG. 8A.

FIG. 8B is a simplified perspective view of a piezoelectric fluid dispenser illustrating an alternative configuration of the dispenser in FIG. 8A. The fluid dispenser in this embodiment includes in addition to the previously described components and features, a dispense head mounting screw 316, as well as an electrical connector 318.

The dispenser 100e further comprises a connector sleeve 178 that is coupled to or engaged with a pin 180 or the like which in turn is coupled to or engaged with one end of the piezoelectric actuator, transducer or element 126. The other end of the piezoelectric actuator, transducer or element 126 is coupled to or engaged with a pad or sleeve 182 or the like which in turn is coupled to or engaged with the tube 114. The pad or sleeve 182 can be bonded to the tube 114 and in combination advantageously provides for a replaceable, removable and disposable unit.

The main body portion or bracket 174 houses and/or supports the various dispenser components. Various clearance spaces and openings can be provided to allow for positioning of the components and passage of wires or cables and the like. The pad or sleeve 182 can be formed by various methods, such as, but not limited to, electrical discharge machining (EDM).

The preloading, clamping, retaining or biasing mechanism, device, assembly or structure 176 generally comprises a spring 184, such as a leaf spring coupled to a mass ball 186 and an actuation arm or lever 188 to provide preloading or clamping on a portion of the tube 114 that is opposed to the piezoelectric actuator, transducer or element 126. The radial forces are shown in FIG. 13 as arrows 190 and 192. The motion of the arm or lever 188 in directions 194 causes the leaf spring to apply and release a force on the mass ball 186 which in turn selectively applies a force on the clamped region 196 of the tube 114. Desirably, the mass ball 186 provides a reactive opposing force in response to the actuation force of the piezoelectric actuator, transducer or element 126. The mass ball 186 may comprise a magnet for coupling with, for example, the leaf spring 184, such that in some embodiments it would provide clearance space for removal and replacement of the dispensing capillary tube 114.

The preloading, clamping, retaining or biasing mechanism, device, assembly or structure 176 of the dispenser 100e can be efficaciously employed with any of the dispensing systems and devices disclosed, taught or suggested herein. The operation of the piezoelectric actuator, transducer or element 126 of the dispenser 100e is similar to as described above and herein.

Figure 9A:
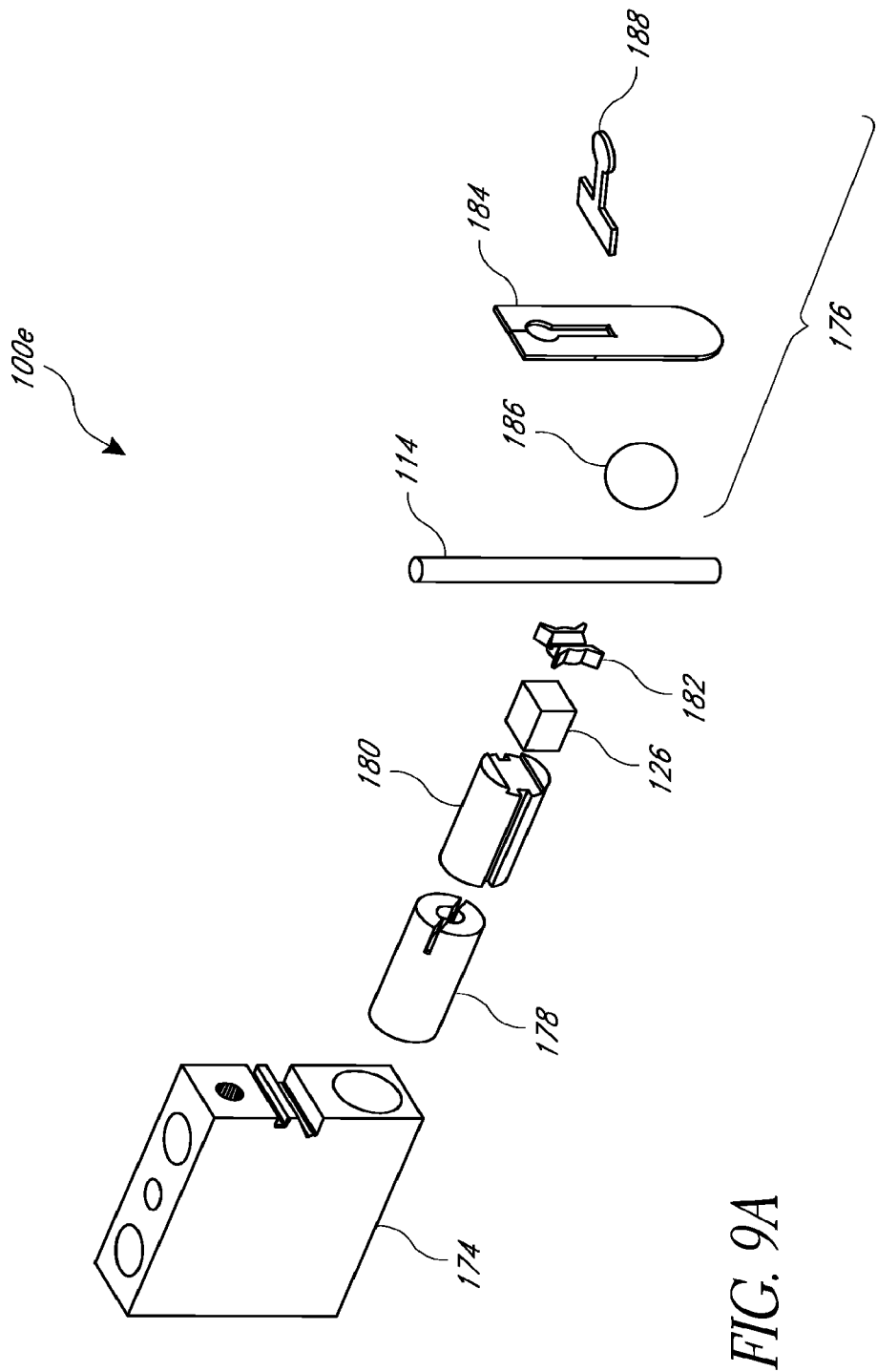
FIG. 9A is a simplified exploded perspective view of the piezoelectric fluid dispenser of FIG. 8A illustrating features and advantages in accordance with certain embodiments.

FIG. 9A is a simplified exploded perspective view of the piezoelectric fluid dispenser of FIG. 8A illustrating features and advantages in accordance with certain embodiments.

Figure 9B:
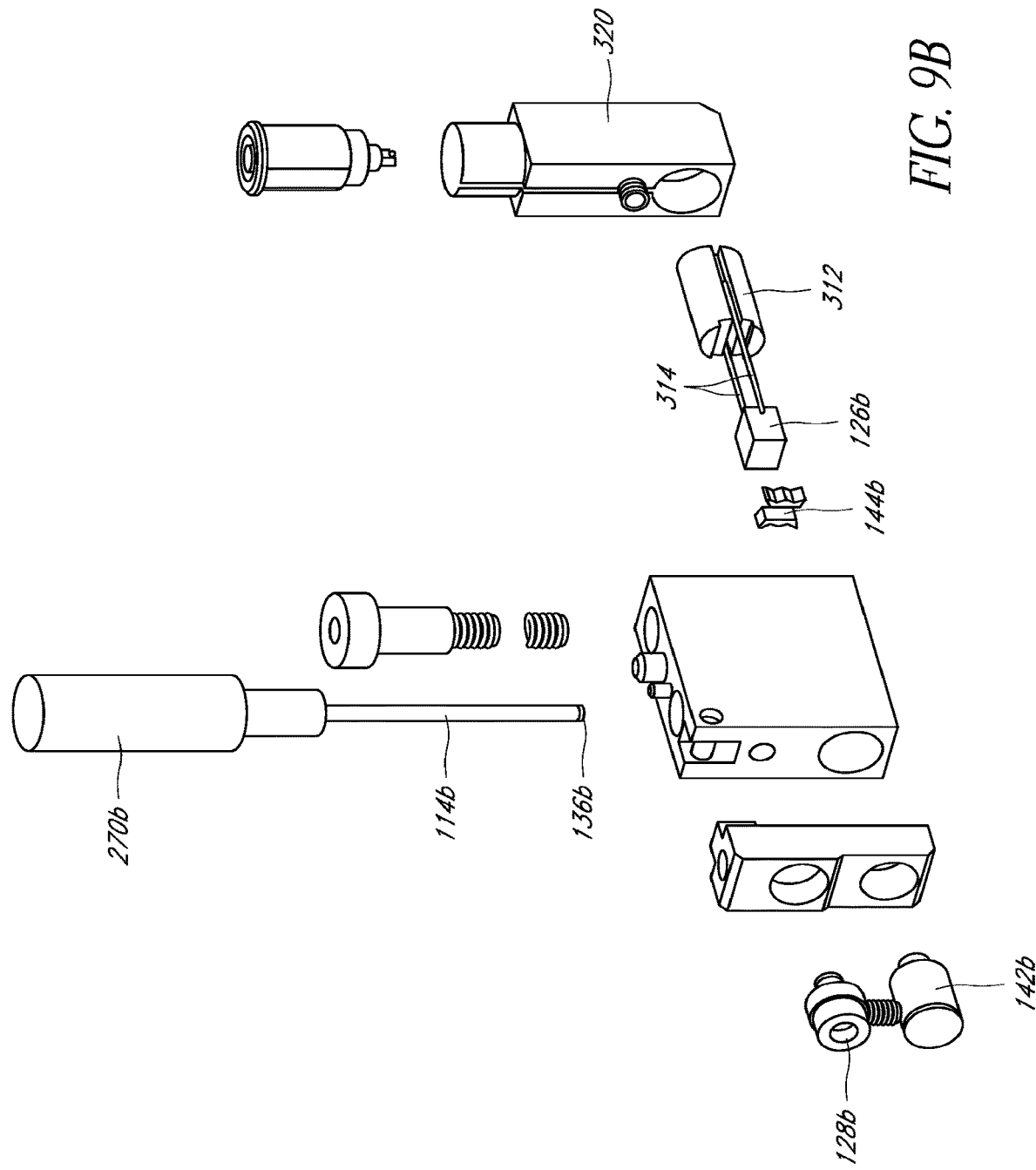
FIG. 9B is a simplified exploded perspective view of the piezoelectric fluid dispenser of FIG. 8B, illustrating features and advantages of that alternative configuration.
Figure 10:
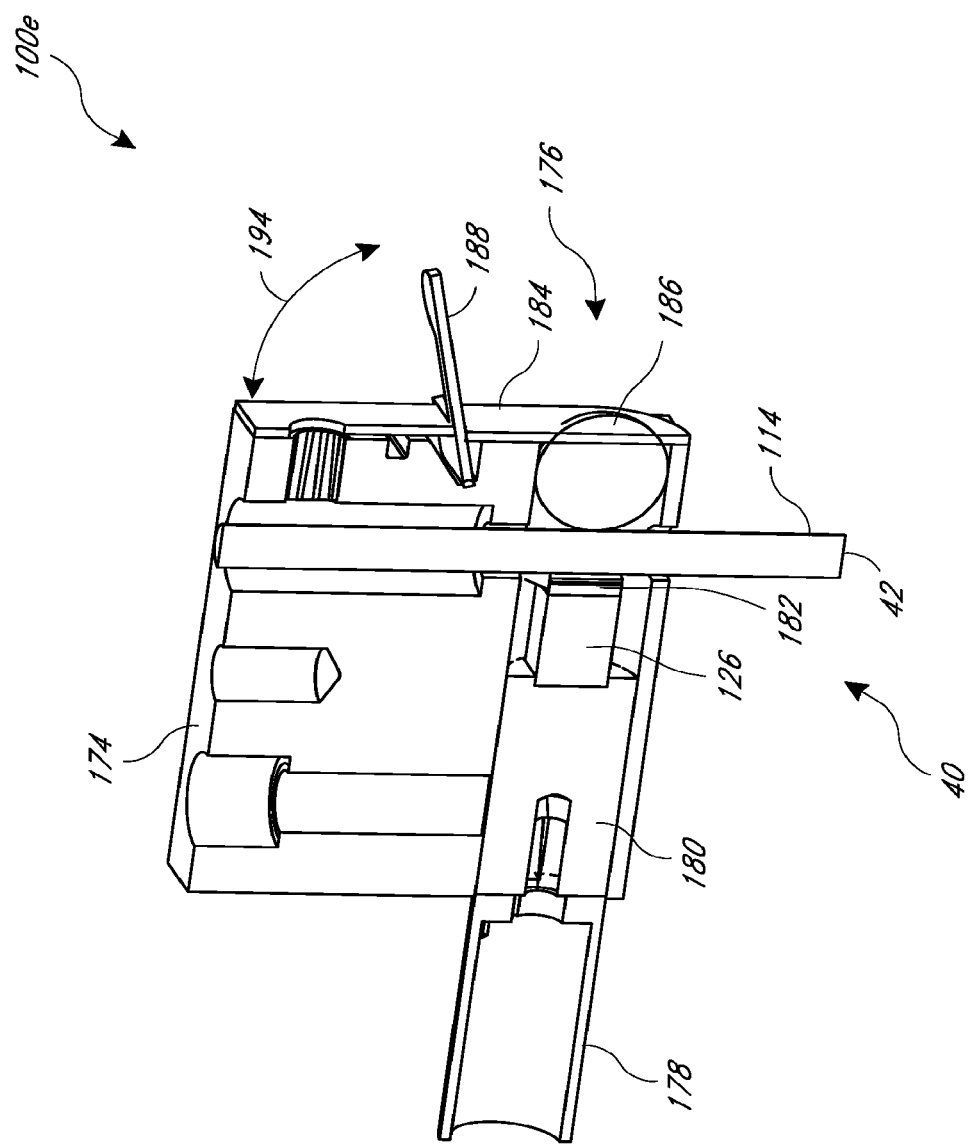
FIG. 10 is a simplified sectional perspective view of the piezoelectric fluid dispenser of FIG. 8A illustrating features and advantages in accordance with certain embodiments.

FIG. 9B is a simplified exploded perspective view of the piezoelectric fluid dispenser of FIG. 8B, illustrating features and advantages of that alternative configuration. In addition to the previously described components and features, the illustrated exploded view also shows the connector housing 320.

It should be noted that, in accordance with embodiments of the piezoelectric dispenser disclosed herein, the piezoelectric device 126 does not completely surround, encircle or circumscribe the outer periphery of the dispensing tube 114, but does so only partially. Stated otherwise, the piezoelectric device is on a first side of the tube while the preloading device is on a second substantially opposed second side of the tube. In any of the embodiments disclosed herein, the piezoelectric device can comprise a linear or longitudinal transducer 126 that is clamped to the capillary tube 114.

Figure 11A:
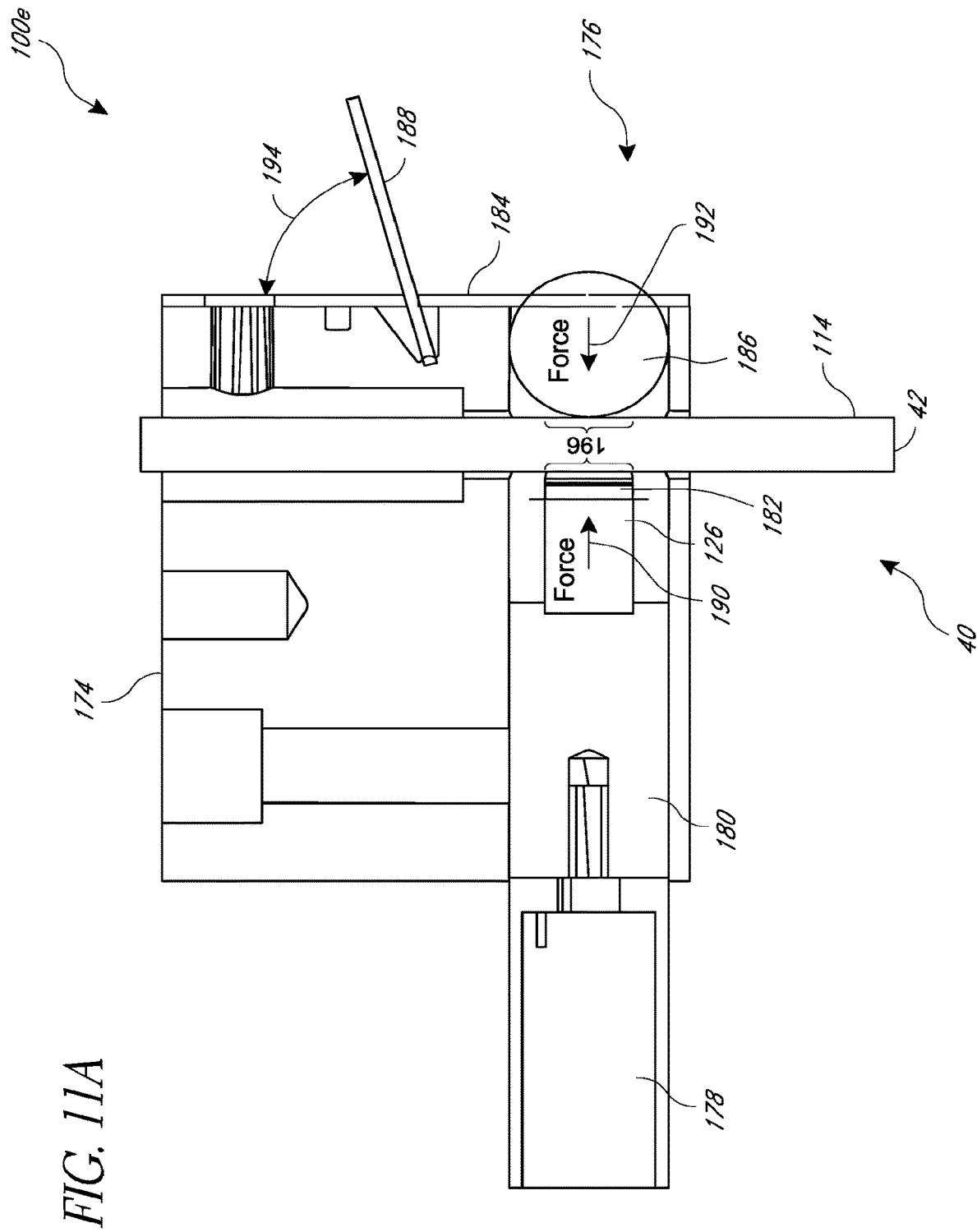
FIG. 11A is a simplified sectional side view of the piezoelectric fluid dispenser of FIG. 8A illustrating features and advantages in accordance with certain embodiments.

FIG. 11A is a simplified sectional side view of the piezoelectric fluid dispenser of FIG. 8A illustrating features and advantages in accordance with certain embodiments.

Figure 11B:
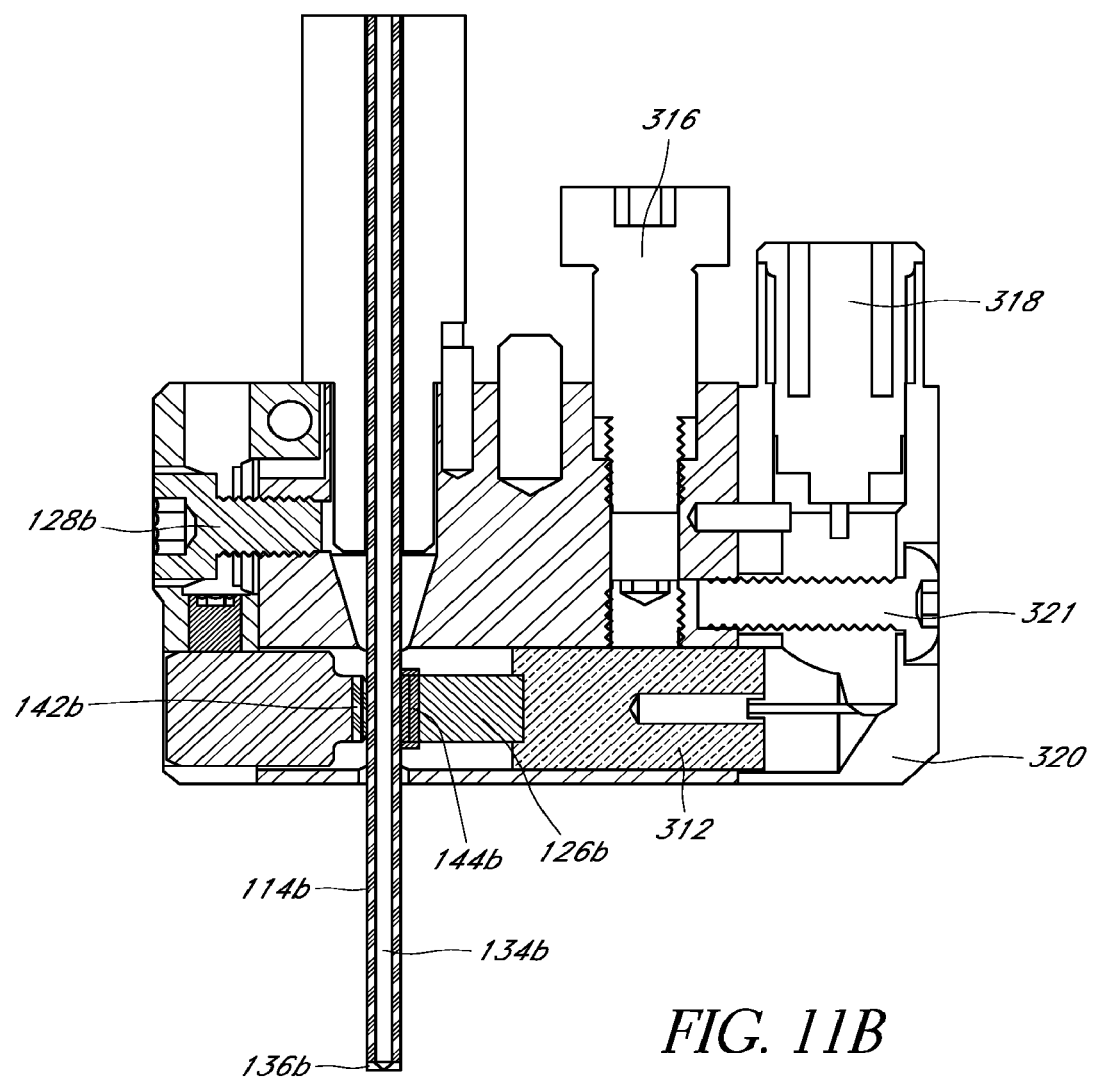
FIG. 11B is a simplified sectional side view of the piezoelectric fluid dispenser of FIG. 8B, illustrating features and advantages of that alternative configuration.

FIG. 11B is a simplified sectional side view of the piezoelectric fluid dispenser of FIG. 8B, illustrating features and advantages of that alternative configuration. In addition to the previously described components and features, the illustrated sectional side view also shows the connector housing mounting screw 321.

The systems, devices, methods and techniques disclosed or suggested herein have various industrial applications. These may be used for dispensing and aspiration of any fluid, which has a viscosity, but not limited to, in the range of about 1 cps to about 30 cps, including all ranges and sub-ranges therebetween. The nozzle aperture plate may have one aperture or a plurality or multiplicity of apertures or outlet orifices.

The size or diameter of the aperture or outlet orifice may be in the range from about 5 microns (μm) or less to about 150 microns (μm) or more. In some embodiments, apertures or outlet orifices that have a size or diameter in the range from about 5 microns (μm) to about 10 microns (μm) can generally produces fine droplets which may be used in the production of a wide variety of aerosol and sprays of various chemical, biological or pharmaceutical materials and liquids.

In one embodiment, the dispensing device or dispenser as disclosed herein may be used as a hand held writing instrument such as an air brush instrument. In this embodiment, the tube may be filled with ink, coloring fluid(s), liquid(s) or the like. In another embodiment, the dispensing tube may comprise a hypodermic needle for delivery of local anesthetic into inflated abdominal space prior to or during a laparoscopy surgical procedure.

FIGS. 12-14 show different views and/or arrangements of a capillary tube assembly 214, in accordance with some embodiments, which can be used in conjunction of any of the dispensing devices or dispensers disclosed herein. In general, such a configuration allows a flexible coupling for the capillary assembly, which advantageously compensates for any undesirable upstream movement caused in the fluid inlet line to allow for proper piezo alignment and operation, while not disturbing the accurate dispensing of fluid from the capillary tube. Advantageously, this also provides for a self-aligning feature and coupling between the capillary tube and the fluid inlet line.

One example of an issue to be addressed is in the capillary design and its connection to the external fluid, liquid or reagent supply line. The capillary tube, in accordance with some embodiments, comprises an elongated glass tube which has two ends. The first upper end defines a fluid inlet to the capillary tube and the lower end defines a droplet dispensing outlet. The lower end is provided with an aperture plate which controls, along with other factors, the size of the droplet to be dispensed.

When the capillary tube receives a piezo-generated radial pulse both ends produce longitudinal displacement pulse. The lower aperture end generates the droplet ejection as expected but the displacement at the upper end can in some cases be a problem particularly if the capillary tube is tightly constrained at the upper upstream end.

Probably because there is reaction force which shakes the capillary tube and affects the droplet formation and/or accuracy. In some cases, the trajectory of the droplet could be affected and in some other cases multiply drops may be generated, which embodiments provide solutions for.

For instance, it has been noted that if the inlet end of the capillary tube is lightly or loosely supported then the noted disturbance problem is substantially reduced or disappears.

Accordingly, in accordance with some embodiments, an upstream or proximal fluid inlet or supply line is connected to the capillary tube using a generally small diameter flexible thin-wall polypropylene (PP) tube. The capillary tube 114, in some embodiments, is connected to this intermediate fluid supplying tube through its internal diameter. In addition, and in accordance with some embodiments, this intermediate supply tube desirably also has a substantially low bending stiffness which allows the capillary tube 114 to easily align to the V groove at the piezo head (see, for example, the embodiment of FIGS. 4A and 4B and related description).

Figure 12A:
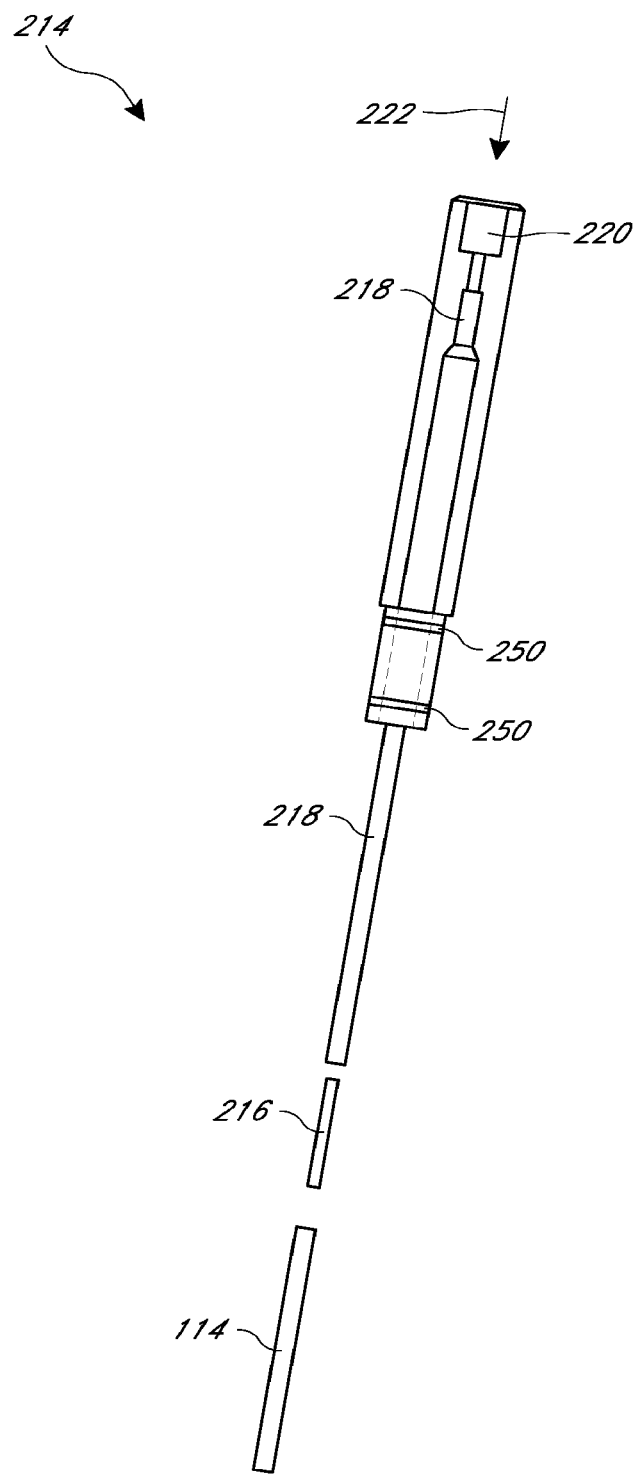
FIG. 12A is a simplified exploded perspective view of a capillary tube assembly of a piezoelectric fluid dispenser illustrating features and advantages in accordance with certain embodiments.

FIG. 12A is a simplified exploded perspective view of a capillary tube assembly of a piezoelectric fluid dispenser illustrating features and advantages in accordance with certain embodiments.

Figure 12B:
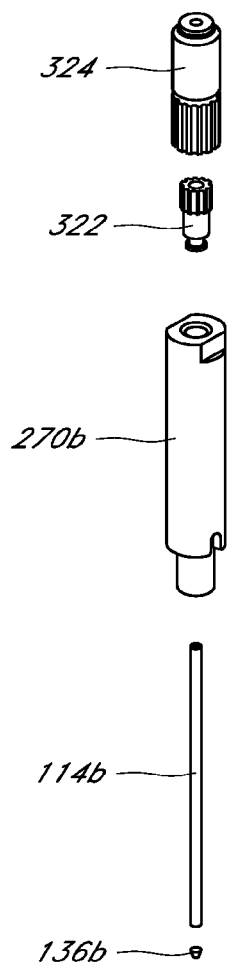
FIG. 12B is a simplified exploded perspective view of a capillary tube assembly of a piezoelectric fluid dispenser illustrating an alternative configuration from that shown in FIG. 12A.

FIG. 12B is a simplified exploded perspective view of a capillary tube assembly of a piezoelectric fluid dispenser illustrating an alternative configuration from that shown in FIG. 12A. In addition to the previously described components and features, this exploded view of the capillary tube assembly also shows a capillary fluid inlet connector 324 and a capillary tube mounting nut 322.

Figure 13A:
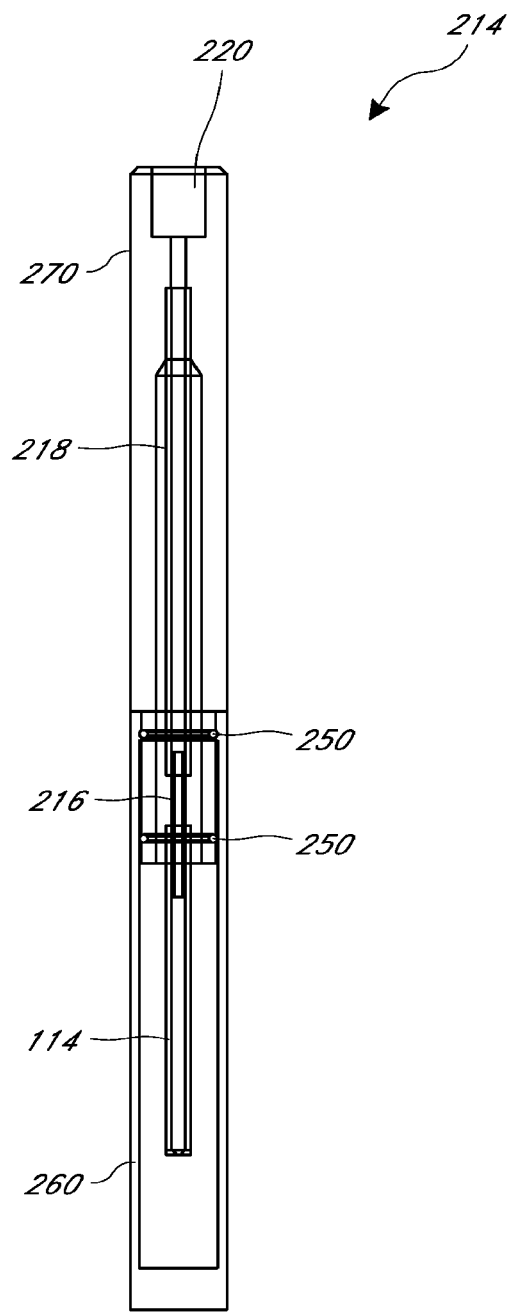
FIG. 13A is a simplified front or rear planar view of the capillary tube assembly of FIG. 12A illustrating features and advantages in accordance with certain embodiments.

FIG. 13A is a simplified front or rear planar view of the capillary tube assembly of FIG. 12A illustrating features and advantages in accordance with certain embodiments.

Figure 14A:
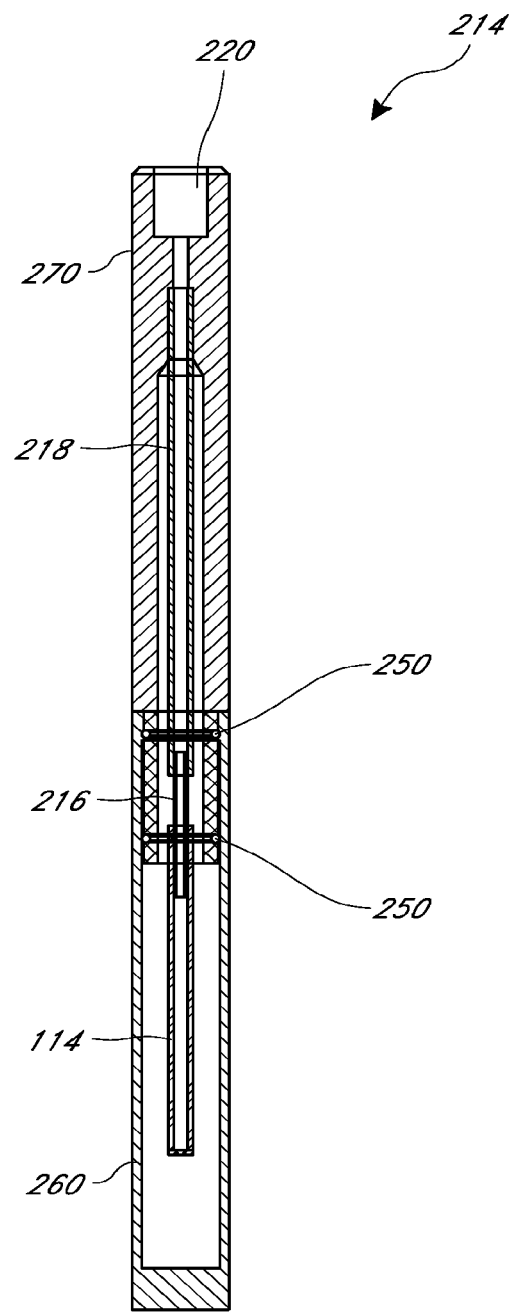
FIG. 14A is a simplified sectional view of FIG. 13A illustrating features and advantages in accordance with certain embodiments.
Figure 13B:
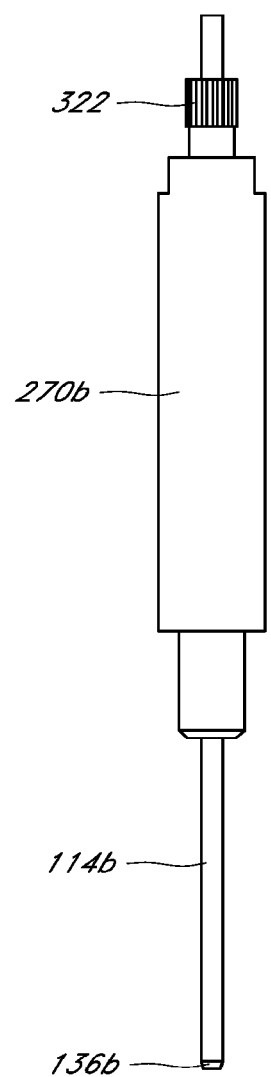
FIG. 13B is a simplified front or rear planar view of the capillary tube assembly of FIG. 12B illustrating features of that alternative configuration.

FIG. 13B is a simplified front or rear planar view of the capillary tube assembly of FIG. 12B illustrating features of that alternative configuration. In addition to the previously described components and features, this FIG. 14A is a simplified sectional view of FIG. 13A illustrating features and advantages in accordance with certain embodiments.

Figure 14B:
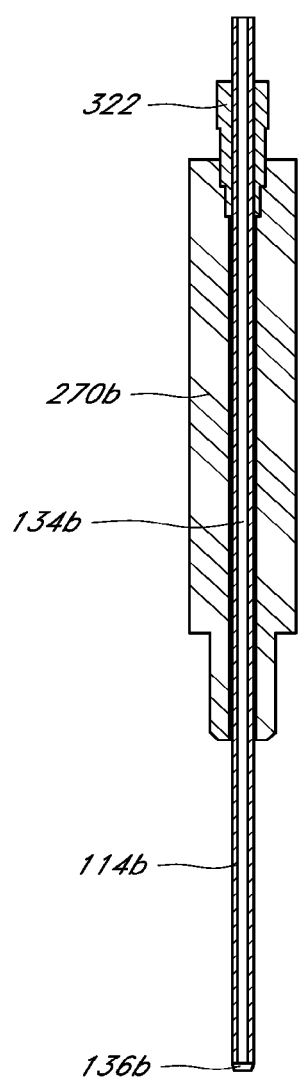
FIG. 14B is a simplified sectional view of FIG. 13B illustrating features of that alternative configuration.

FIG. 14B is a simplified sectional view of FIG. 13B illustrating features of that alternative configuration.

In accordance with some embodiments, the capillary tube assembly 214 generally comprises the distal capillary tube 114, an intermediate supply line connection tube 216, a proximal intermediate supply line connection tube 218, and a fluid inlet port 220 that receives flow 222 of the fluid to be dispensed. O-rings 250 or the like can provide for sealing coupling between selected components of the assembly 214.

In some embodiments, the capillary tube assembly 214 further comprises a capillary protective cover 260 and a capillary housing 270. In one non-limiting embodiment, the capillary housing 270 comprises a plastic or thermoplastic such as polyether ether ketone (PEEK).

In one non-limiting embodiment, the capillary tube 114 comprises glass and has an outer diameter of about 1.5 mm and an inner diameter of about 800 microns (μall) or less. In one non-limiting embodiment, the fluid supply connection tube 216 comprises polypropylene and has an outer diameter of about 800 μm and an inner diameter of about 500 μm or less. In one non-limiting embodiment, the fluid supply connection tube 218 comprises PEEK plastic and has an outer diameter of about 1.5 mm and an inner diameter of about 800 μm or less.

The fluid supply line 216 that connects or couples to the capillary tube 114 desirably has a relatively small inner diameter. In one non-limiting, the inner diameter of the fluid supply line or connection tube 216 is about 500 μm or less. In another non-limiting, the inner diameter of the fluid supply line or connection tube 216 is about 250 μm.

In one non-limiting embodiment, the supply lines, such as the connection tubes 216 and 218, are made from PEEK and/or polypropylene plastic or thermoplastic. The small tube diameter and the surface energy of the plastic, such as PEEK, desirably produce a capillary force that holds the fluid tightly within the supply lines. In this way, and advantageously, the movement of the system's X-Y-Z table is minimally transferred to the fluid inside the capillary tube 114. This fluid supply line arrangement desirably also help in generating a consistent drop size.

The consistency of drop size may be measured by the coefficient of variation (CV) using an automatic video inspection system, such as the imaging system 30 (see FIG. 1). The dispensing system or machine is provided with a vision system which measures the drop size and automatically calculates and displays real time statistical information for the drop size which includes the calculated CV value. Advantageously the X-Y or X-Y-Z table is provided with a multiple or 5 phase stepping motor which generates smooth and continuous movements, which further contributes to the consistency of the droplets.

In some embodiments, when the dispensing systems disclosed herein are used to dispense a solution that contains protein there is a possibility that one or more molecules of said protein will bind to one or more surfaces of the capillary tube's aperture or aperture plate and at least partially clog the aperture. Advantageously, to prevent any such undesirable clogging a suitably coated aperture plate is provided.

To prevent any such clogging, in one non-limiting embodiment, a gold plated electro-formed aperture plate may be used. The gold plated aperture may be coated by Self Assembled Monolayer (SAM) which chemically binds to gold and creates a single molecular layer which substantially prevents or mitigates protein molecule(s) from binding to it. An example of such a self assembled monolayer material is Poly (ETHYLENE GLYCOL) methyl ether thiol CH3O (CH2CH2O)Nch2ch2SH. The procedure for preparation and application of such a self-assembled monolayer (SAM) on gold is defined in Sigma Aldrich Technical Bulletin #AL-266 which is hereby incorporated by reference herein.

In some embodiments, the container or tube assembly 160 can have a tapered tube end such that the inner diameter of the tube end distally decreases to the opening 162 so as to provide an enhanced connection and/or fusion with the aperture plate 118 and/or the aperture or outlet orifice 134.

In some embodiments, a hydrophilic surface treatment is provided on fluid contacting surfaces of the system, such as those of the capillary tube 114 to enhance solid-liquid coupling. Advantageously, the hydrophilic coating enhances the solid-fluid interaction, that is, substantially prevents or minimizes any slippage of the fluid from the oscillating, vibrating or moving tube aperture so that transmission of mechanical energy (movement or acceleration) to acoustic pressure is effectively enhanced or improved.

In some embodiments, a hydrophobic coating is provided on external surfaces of the system, such as those of the capillary tube 114, so that no or minimal fluid adheres to the tube's external aperture sides. In one non-limiting embodiment, the hydrophobic coating comprises Polytetrafluoroethylene (PTFE).

In some embodiments, a plurality of dispensing heads, including any as taught, disclosed or suggested herein, are combined into a single system, assembly, combination, arrangement or member to provide for dispensing through a system comprising a plurality of piezo-actuated capillary tubes. For example, the system can comprise a plurality of the piezoelectric dispensing devices or dispensers 100e of FIGS. 8A and 8B. In some embodiments, this system incorporates a multiple unit dispenser block to advantageously mitigate any displacement issues with respect to the proper arrangement of the tubes in at least the X-Y plane. In one non-limiting embodiment, the dispenser block comprises stainless steel so that the piezo impact does not make the block "ring" due to dampening of energy. In another non-limiting embodiment, the dispenser block comprises a material having a density of at least about 5,000 kg/m$^3$ to about 8,300 kg/m$^3$ is utilized so that the piezo impact does not make the block "ring" due to dampening of energy.

In some embodiments, a film or the like with predetermined damping properties is provided, for example, between the leaf spring 184 and loading ball 186 of FIGS. 8-11. Advantageously, the film provides damping to mitigate unwanted spring related contact with the ball. Desirably, the film has properties that allow for maintenance of shape and/or damping properties over an extended time period. In one non-limiting embodiment, the film comprises a rubber material, such as, EPDM rubber (ethylene propylene diene monomer (M-class) rubber).

In some embodiments, an optimized drive circuitry including a computerized software and hardware control system is utilized to fine tune and/or optimize dispense operations of any of the dispensing devices, systems, dispenser heads, dispenser blocks or dispensers disclosed herein based on particular fluid, liquid or reagent properties. Such a control system or controller can utilize optimized configurations of resistors (e.g., in parallel), potentiometers, and other electronic circuitry components, as needed or desired. Advantageously, this permits operation of the piezo dispensing embodiments disclosed herein to optimally adapt to the fluid being dispensed, such as certain oils which can efficaciously be dispensed in accuracy by modifying certain control parameters of the control system.

In some embodiments, a degasser or the like is provided upstream of the dispensing capillary tube 114 such that the fluid, liquid or reagent is substantially free of any unwanted gaseous content. An optimized fluid circuit design is utilized, including head height control, to achieve accurate operation.

In one non-limiting embodiment, the capillary tube 114 is formed from a glass material, such as, borosilicate glass or the like.

EXAMPLES

A primary focus of the following examples was to evaluate transducer design.
I. Configuration:
Borosilicate capillary: Spring/Ball/V clamp
60 μm sapphire apertures, nickel plated gold apertures
Reagent: BSA, DNA
Voltage only Using borosilicate glass capillary tubes with sapphire apertures and nickel-plated gold apertures, it was found that for a 60 micron aperture, a single drop size could be achieved between 100-120 pL with voltage adjustments, and for a 100 micron aperture, a single drop size could be achieved between 180-200 pL (See Table I). These results were independent of aperture type. Below and above these volumes the dispensed volumes were in the form of multiple smaller drops. The drop distribution and single drop volume was measured using a horizontal drop camera which could image both single and multiple drops as well as measure the single drop volume. Using a laser interferometer to measure the displacement of the aperture attached to the glass capillary parallel to the capillary length it was determined that there was a displacement wave form that attenuated with time. This was interpreted to indicate that the piezo element displacement was composed of a continued waveform with amplitude that dissipated with time. Thus, the single piezo pulse resulted in a spring like action of the aperture that was producing multiple drop formation, but that there was a small volume range where a stable single drop could be formed. It was determined that the source of the aperture vibration was the low compliance of the spring and ball clamp on the side opposite the piezoelectric element.

TABLE I

| Aperture | Voltage | Volume | CV |
|---|---|---|---|
| 60 um | 15 V | 110 pL | 3.9% |
| 100 um | 19 V | 181 pL | 2.3% |

Figure 15:
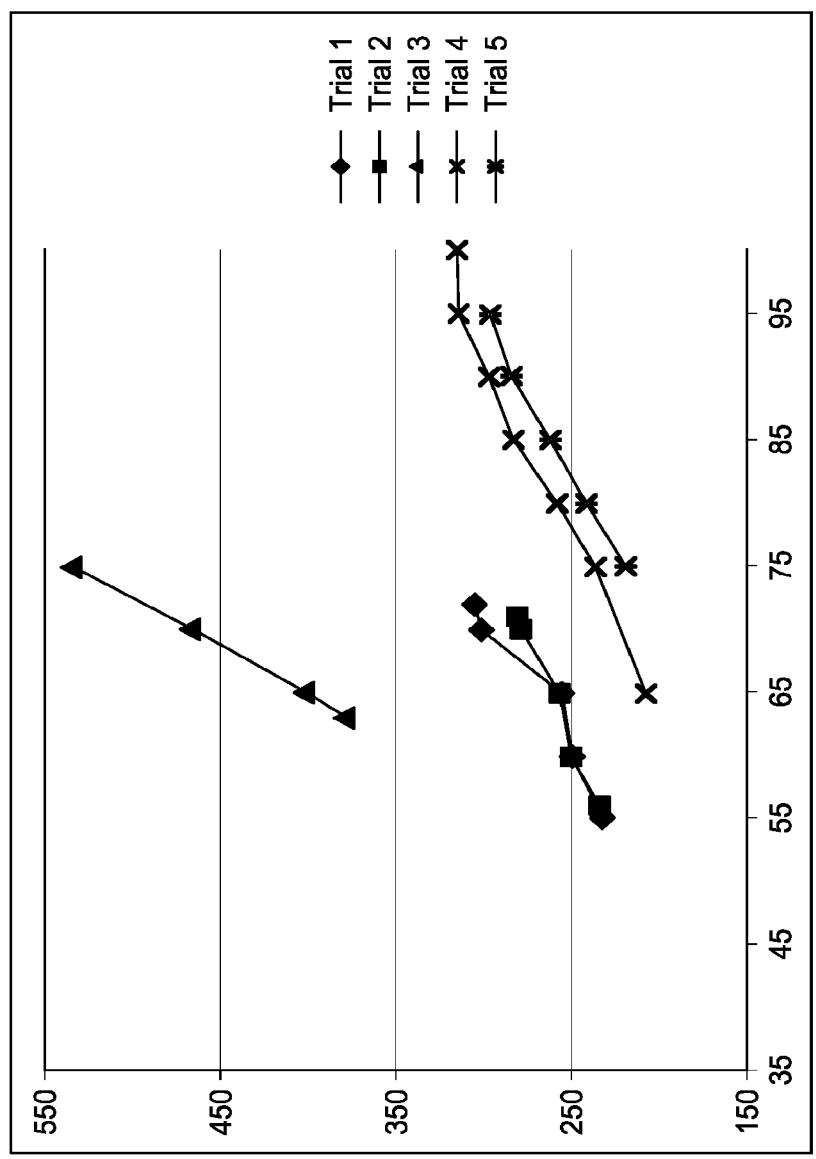
FIG. 15 is a graph plotting the data from Table II.

II. Configuration:
PEEK capillary: Spring/Ba/V clamp
100 μm sapphire apertures
Reagent: BSA. DNA
Voltage only Using a similar size PEEK capillary showed that the aperture vibrations could be reduced in size and amplitude and hence increases the range of single drop stability. The modulus of elasticity for borosilicate is about $9 \times 10^6$ psi whereas the modulus of elasticity for PEEK is in the range of about 0.6 to $1.5 \times 10^6$ psi. Hence, the PEEK should dampen the capillary oscillations due the piezo actuation and provide drop stability over a larger volume range. This was shown to be the case for the experimentally measured stable single drop range with the 100 micron apertures. The 100 micron aperture provided an improved stable drop range of 200 to 500 pL. See Table II below. However, it was observed that the improvement in the stable drop range seen with PEEK tended to vary between different capillary tubes. The variability of the stable drop range between capillary tubes was found to result from variation in the ball/springe clamp mechanism, in that it was difficult to consistently maintain a constant spring tension within the head assembly. This variability can be readily appreciated from FIG. 15, in which the data from Table II is plotted.

TABLE II

| Trial | Voltage | Volume |
|---|---|---|
| 1 | 55 V | 233 pL |
|   | 60 V | 248 pL |
|   | 65 V | 255 pL |
|   | 70 V | 302 pL |
|   | 72 V | 306 pL |
| 2 | 56 V | 234 pL |

TABLE II-continued

| Trial | Voltage | Volume |
|---|---|---|
|   | 60 V | 250 pL |
|   | 65 V | 257 pL |
|   | 70 V | 280 pL |
|   | 71 V | 281 pL |
| 3 | 63 V | 380 pL |
|   | 65 V | 403 pL |
|   | 70 V | 469 pL |
|   | 75 V | 536 pL |
| 4 | 65 V | 208 pL |
|   | 75 V | 237 pL |
|   | 80 V | 259 pL |
|   | 85 V | 285 pL |
|   | 90 V | 299 pL |
|   | 95 V | 316 pL |
|   | 100 V | 317 pL |
| 5 | 75 V | 220 pL |
|   | 80 V | 243 pL |
|   | 85 V | 264 pL |
|   | 90 V | 286 pL |
|   | 95 V | 298 pL |

Figure 16:
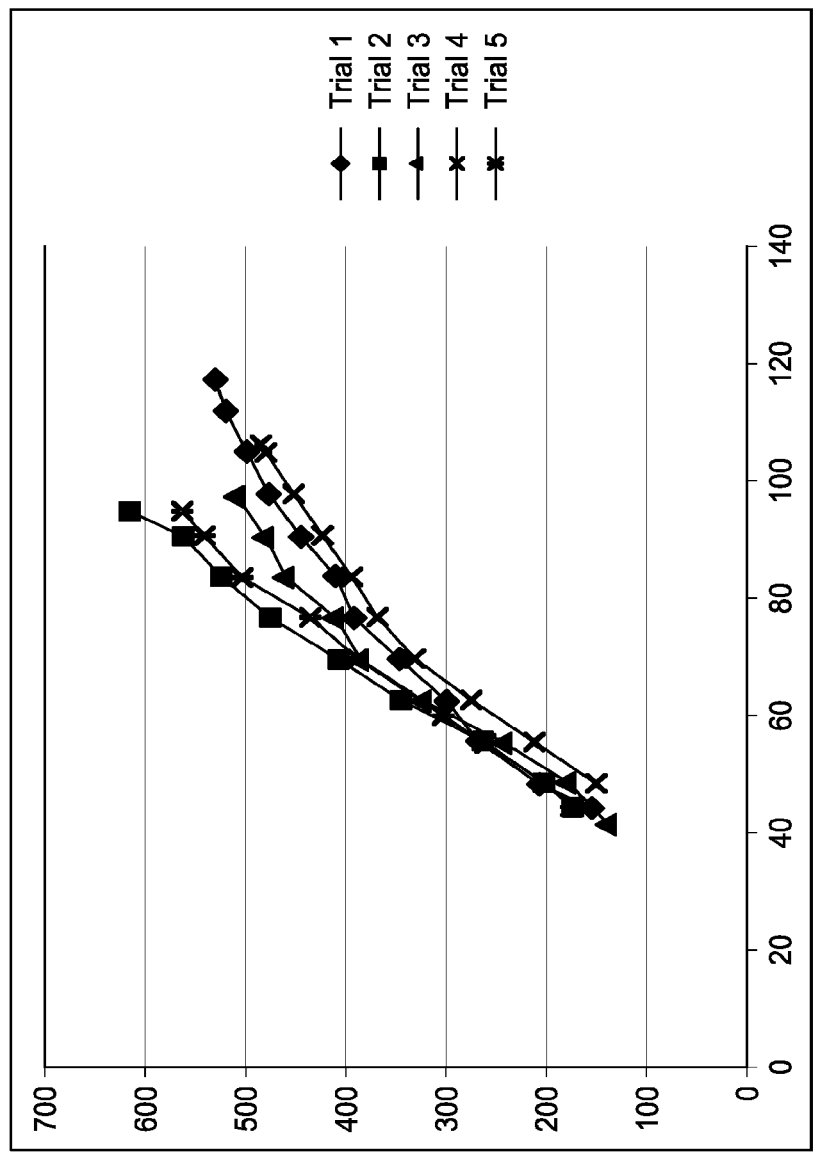
FIG. 16 is a graph plotting the data from Table III.

III. Configuration:
PEEK capillary: Double V Clamp
100 urnm sapphire apertures
Reagent: BSA, DNA
Voltage only In order to improve the variability of the stable drop range the PEEK capillary system was evaluated with the double V clamp as shown in FIG. 4B, but without the sleeve around the PEEK capillary. The double V clamp provides an operative coupling between the piezoelectric actuator and the capillary tube, in which the coupling is configured to allow replacement of capillary tubes and is adjustable to provide sufficient mechanical stability to reduce variations in droplet volumes between capillary tubes. The result was that the variability between capillaries was substantially improved and even just as important, the stable drop volume range was substantially improved to 80 pL up to about 1300 pL for a 100 micron aperture using adjustments of the piezoelectric element drive voltage. See Table III below. Stable drop volume and reduced variations between capillary tubes can be appreciated from FIG. 16, in which the data from Table III is plotted. The major surprise is that the stable drop range was obtainable over a factor 13 in drop volume using a single aperture size. Using an 80 micron aperture size a similar drop range was also achievable. The piezoelectric element drive voltage was the independent variable for controlling the drop volume. In general, with classical piezoelectric dispensing, the aperture size has been important to achieving a volume range, where small apertures in the 50-60 micron range are required to dispense 100-200 pL drops, and larger apertures in the range of 80-100 microns are required to achieve drop sizes up into the 800 pL range. This is a new, important and unexpected result.

A second important discovery was that a wide range of reagents could be dispensed with no special treatments of the apertures. This included DNA, proteins, etc.

TABLE III

| Trial | Voltage | Volume |
|---|---|---|
| 1 | 44.8 V | 154 |
|   | 49 V | 208 |
|   | 56 V | 269 |
|   | 63 V | 298 |
|   | 70 V | 346 |

TABLE III-continued

| Trial | Voltage | Volume |
|---|---|---|
| | 77 V | 392 |
| | 84 V | 411 |
| | 91 V | 445 |
| | 98 V | 478 |
| | 105 V | 500 |
| | 112 V | 522 |
| | 117.6 V | 532 |
| 2 | 44.8 V | 174 |
| | 49 V | 200 |
| | 56 V | 264 |
| | 63 V | 346 |
| | 70 V | 406 |
| | 77 V | 475 |
| | 84 V | 525 |
| | 91 V | 562 |
| | 95.2 V | 615 |
| 3 | 42 V | 140 |
| | 49 V | 181 |
| | 56 V | 245 |
| | 63 V | 325 |
| | 70 V | 390 |
| | 77 V | 414 |
| | 84 V | 465 |
| | 91 V | 482 |
| | 98 V | 513 |
| 4 | 49 V | 150 |
| | 56 V | 212 |
| | 63 V | 275 |
| | 70 V | 332 |
| | 77 V | 369 |
| | 84 V | 396 |
| | 91 V | 425 |
| | 98 V | 455 |
| | 105 V | 482 |
| | 106.4 V | 486 |
| 5 | 44.8 V | 176 |
| | 49 V | 203 |
| | 56 V | 259 |
| | 63 V | 329 |
| | 70 V | 389 |
| | 77 V | 437 |
| | 84 V | 505 |
| | 91 V | 542 |
| | 95.2 V | 563 |

*Table above demonstrates improved stability with the double V clamp. Low end and high end volume ranges are not included because of the need to adjust both voltage and charge resistor.

IV. Configuration
PEEK capillary: Double V Clamp
100 μm sapphire apertures
Reagents: solutions of DNA and protein antibodies in glycerol up to 60% glycerol
Voltage coupled with Charge resistor A third important discovery was that once the drop size stability was established the influence of the charge resistor value was investigated and found to be important in controlling the ability to deal with dispensing of reagents with different rheology properties such as glycerol. For example it was shown that different concentrations of an aqueous reagent with a viscous buffer like glycerol could be dispensed by using the charge resistor control on the piezoelectric element in combination with the drive voltage. See Table IV below. Using faster charge times enabled higher viscosities to be efficiently dispensed. Even more important is that a series of dilutions could all be dispensed at the same volume using the charge resistor control function. The effect of the charge resistor is to increase the acceleration of the piezoelectric element in shearing the fluid within the capillary thus providing increase flow velocity of the viscous reagent through the aperture.

TABLE IV

| Percent Glycerol | Voltage | Charge Resistor | Volume |
|---|---|---|---|
| 0 | 50 V | 15.5 Ω | 270 pL |
| 20 | 52 V | 10.5 Ω | 285 pL |
| 40 | 56 V | 7 Ω | 283 pL |
| 60 | 71 V | 5.5 Ω | 286 pL |
| 70 | 70 V | 1 Ω | 326 pL |

Any of the methods which are described and illustrated herein are not limited to the sequence of acts described, nor are they necessarily limited to the practice of all of the acts set forth. Other sequences of acts, or less than all of the acts, or simultaneous occurrence of the acts, may be utilized in practicing embodiments.

It is to be understood that any range of values disclosed, taught or suggested herein comprises all values and sub-ranges therebetween. For example, a range from 5 to 10 will comprise all numerical values between 5 and 10 and all sub-ranges between 5 and 10.

From the foregoing description, it will be appreciated that a novel approach for dispensing (and aspirating) of micro-volumes of fluids has been disclosed. While the components, techniques and aspects of embodiment have been described with a certain degree of particularity, it is manifest that many changes may be made in the specific designs, constructions and methodology herein above described without departing from the spirit and scope of this disclosure.

While a number of embodiments and variations thereof have been described in detail, other modifications and methods of using and diagnostic, assaying, arraying, medical, biotech and printing applications for the same will be apparent to those of skill in the art. Accordingly, it should be understood that various applications, modifications, and substitutions may be made of equivalents without departing from the spirit of the disclosure or the scope of the claims.

Various modifications and applications of disclosed embodiments may occur to those who are skilled in the art, without departing from the true spirit or scope of the disclosure. It should be understood that the disclosure is not limited to the embodiments set forth herein for purposes of exemplification, but is to be defined only by a fair reading of the appended claims, including the full range of equivalency to which each element thereof is entitled.

What is claimed is:

1. A dispenser for transferring a predetermined quantity of a liquid, comprising:
  a longitudinal transducer, comprising:
  a capillary tube comprising polyether ether ketone (PEEK) and having a tip at a distal end of the capillary tube;
  a piezoelectric actuator operatively coupled to the capillary tube at a location proximal of the tip;
  an aperture at the tip of the capillary tube; and
  a flexible supply line located upstream of the capillary tube and configured to couple to and supply the liquid to the capillary tube;
  wherein actuation of the piezoelectric actuator causes a pressure wave to propagate from said location of the capillary tube toward the tip of the capillary tube such that radial motion at said location of the capillary tube is transmitted as distally extending axial motion of the tip of the capillary tube, thereby causing a droplet of a predetermined volume to be ejected from the aperture;
  wherein the capillary tube has a modulus of elasticity configured to dampen acoustical noise from the actuation and provide single drop stability over a range of drop sizes above and below a single droplet size corresponding to borosilicate glass capillary tubes having a diameter of the aperture equal to the diameter of the aperture of the capillary tube.

2. The dispenser of claim 1, wherein the coupling between the capillary tube and the flexible supply line provides a self-aligning feature.

3. The dispenser of claim 1, wherein the operative coupling between the capillary tube and the piezoelectric actuator is configured to allow replacement of capillary tubes and is adjustable to provide sufficient mechanical stability to reduce variations in droplet volumes between capillary tubes.

4. The dispenser of claim 1, wherein the operative coupling between the capillary tube and the piezoelectric actuator is a double V clamp.

5. The dispenser of claim 1, wherein the capillary tube comprises an aperture plate that defines the aperture.

6. The dispenser of claim 5, wherein the aperture plate is gold-plated nickel or sapphire.

7. A method of transferring a predetermined quantity of a liquid, comprising:
   coupling a flexible supply line to a capillary tube, the capillary tube comprising polyether ether ketone (PEEK) using a self-aligning feature;
   supplying liquid from the flexible supply line to the capillary tube, wherein the capillary tube comprises a distal end with a tip and an aperture thereat;
   coupling a piezoelectric actuator to the capillary tube at a location along the capillary tube, wherein the coupling between the piezoelectric actuator and the capillary tube is configured to allow replacement of capillary tubes and is adjustable to provide substantially uniform mechanical stability between the piezoelectric actuator and replaceable capillary tubes;
   actuating the piezoelectric actuator such that a pressure wave propagates from said location along the capillary tube toward the tip of the capillary tube and radial motion at said location is transmitted as axial motion of the tip, thereby causing a droplet of a predetermined volume to be ejected from the aperture; wherein the capillary tube has a modulus of elasticity configured to dampen acoustical noise from the actuation and provide single drop stability over a range of drop sizes.

8. The method of claim 7, further comprising adjusting the coupling between the piezoelectric actuator and the capillary tube to reduce variation in droplet volume between capillary tubes.

9. The method of claim 7, further comprising adjusting a piezoelectric voltage, a charge resistor, or both a voltage and a charge resistor to enable dispensing a range of liquid viscosities at equivalent predetermined droplet volumes.

* * * * *